US012275075B2

(12) United States Patent
Kordus et al.

(10) Patent No.: US 12,275,075 B2
(45) Date of Patent: *Apr. 15, 2025

(54) SAMPLE PREPARATION SAW

(71) Applicant: Illinois Tool Works Inc., Glenview, IL (US)

(72) Inventors: Bryan J. Kordus, Mount Pleasant, WI (US); Chelsea B. Frid, Chicago, IL (US); Jeffrey E. Joray, Lake Villa, IL (US); Nanu M. Vahora, Bartlett, IL (US); Sarah M. Beranek, Glenview, IL (US); Michael Shtilman, Buffalo Grove, IL (US); Douglas A. Ceckowski, Gurnee, IL (US)

(73) Assignee: Illinois Tool Works Inc., Glenview, IL (US)

( * ) Notice: Subject to any disclaimer, the term of this patent is extended or adjusted under 35 U.S.C. 154(b) by 413 days.

This patent is subject to a terminal disclaimer.

(21) Appl. No.: 16/742,503

(22) Filed: Jan. 14, 2020

(65) Prior Publication Data
US 2020/0290139 A1   Sep. 17, 2020

Related U.S. Application Data

(63) Continuation of application No. 16/333,080, filed as application No. PCT/US2017/055088 on Oct. 4, 2017, now Pat. No. 10,532,415.
(Continued)

(51) Int. Cl.
B23D 47/12  (2006.01)
B23D 45/02  (2006.01)
(Continued)

(52) U.S. Cl.
CPC ............. *B23D 47/12* (2013.01); *B23D 45/02* (2013.01); *B23D 47/04* (2013.01); *B23D 59/02* (2013.01); *B24B 49/18* (2013.01); *B24B 53/12* (2013.01)

(58) Field of Classification Search
CPC ........ B23D 47/12; B23D 45/02; B23D 59/02; B24B 49/18
See application file for complete search history.

(56) References Cited

U.S. PATENT DOCUMENTS 2,716,908 A * 9/1955 Lundberg ............... B23D 63/14
451/420
3,272,343 A * 9/1966 Caldwell ................ B01D 29/03
210/521
(Continued)

FOREIGN PATENT DOCUMENTS

CN    201399620    2/2010
CN    101704130    5/2010
(Continued)

OTHER PUBLICATIONS

English Translation of DE29811101 (Year: 1998).*
(Continued)

*Primary Examiner* — Jennifer S Matthews
(74) *Attorney, Agent, or Firm* — McAndrews, Held & Malloy, Ltd.

(57) ABSTRACT

A sample preparation saw has a base, a housing, a saw assembly mounted to the base, a dressing assembly, a sample clamping assembly mounted to the base, and a reservoir assembly. The saw assembly includes a blade assembly with a rotating blade. The blade assembly is movable along x-, y- and z-axes by at least two drives. The dressing assembly is operable to dress the rotating blade. The sample clamping assembly includes a rail, a sample mount removably positioned on the rail and a saddle operable to hold a sample. The
(Continued)

reservoir assembly is operable to recirculate a rinse fluid sprayed on the rotating blade, and includes a basin having a pump and a series of weirs.

19 Claims, 27 Drawing Sheets

Related U.S. Application Data

(60) Provisional application No. 62/406,093, filed on Oct. 10, 2016.

(51) Int. Cl.
   *B23D 47/04* (2006.01)
   *B23D 59/02* (2006.01)
   *B24B 49/18* (2006.01)
   *B24B 53/12* (2006.01)

(56) References Cited

U.S. PATENT DOCUMENTS

| | | | | |
|---|---|---|---|---|
| 3,289,663 | A * | 12/1966 | Cary | B23D 59/02 451/287 |
| 5,161,443 | A * | 11/1992 | Huang | B23D 59/02 83/494 |
| 5,305,671 | A | 4/1994 | Wachs | |
| 5,456,147 | A | 10/1995 | Stange, Jr. | |
| 9,266,179 | B2 * | 2/2016 | Geiser | B24B 53/00 |
| 2001/0035535 | A1 | 11/2001 | Hayashi | |
| 2008/0118312 | A1 | 5/2008 | Lihl | |
| 2012/0051486 | A1 * | 3/2012 | Uda | G21C 15/18 376/282 |
| 2012/0100780 | A1 | 4/2012 | Weingart | |
| 2015/0217472 | A1 | 8/2015 | Adair | |

FOREIGN PATENT DOCUMENTS

| | | | |
|---|---|---|---|
| CN | 101806680 A | 8/2010 | |
| CN | 201587044 | 9/2010 | |
| CN | 101862859 | 10/2010 | |
| CN | 101927379 | 12/2010 | |
| CN | 102172876 | 9/2011 | |
| CN | 202878681 | 4/2013 | |
| CN | 103447612 | 12/2013 | |
| CN | 104209814 | 12/2014 | |
| CN | 204934723 | 1/2016 | |
| CN | 105382333 | 3/2016 | |
| CN | 105436612 | 3/2016 | |
| CN | 105728837 | 7/2016 | |
| CN | 105750635 | 7/2016 | |
| DE | 29811101 | 9/1998 | |
| DE | 29811101 U1 * | 9/1998 | ........... B23D 45/024 |
| EP | 1700657 | 9/2006 | |
| JP | 5571331 B2 * | 8/2014 | |
| KR | 20160119694 A * | 10/2016 | |
| WO | WO-9731756 A1 * | 9/1997 | ............. B23Q 1/623 |

OTHER PUBLICATIONS

English Translation of DE29811101 (Google Translation) (Year: 1998).*

Int'l Search Report and Written Opinion Appln No. PCT/US2017/055088 mailed Dec. 21, 2017 (12 pgs).

* cited by examiner

SAMPLE PREPARATION SAW

This Non-Provisional Application is a continuation application of U.S. application Ser. No. 16/333,080 filed Mar. 13, 2019 (U.S. Pat. No. 10,532,415), which is a 371 of PCT/US2017/055088 filed Oct. 4, 2017, which claims benefit to U.S. Provisional Application Ser. No. 62/406,093 filed on Oct. 10, 2016, now expired, the complete subject matter of which is expressly incorporated herein in its entirety.

BACKGROUND

The examination of specimens, such as metals, ceramics, composites, cements, laminates, plastics, electronic components and biomaterials may require a number of preparatory steps. For example, a specimen may need to be cut or sectioned to a specific size prior to mounting for examination.

Saws are known for carrying out the sectioning, e.g., cutting of samples. Saws can be free-standing types, such as that disclosed in Adair et al., US Publication No. 2015/0217472 or table-top types, such as that disclosed in, US Publication No. 2012/0100780, the disclosures of which is incorporated herein by reference in its entirety.

In a typical sample preparation saw, the specimen is secured in a vise or chuck. The chuck is secured in an assembly that can be moved toward and away from the blade to position the specimen for cutting. The assembly is positioned along a T-slot in the base of the saw and secured by fasteners, such as screws or bolts. To remove or reposition the specimen, bolts are removed from the chuck and an upper portion, such as a saddle is removed to reposition the specimen. The assembly is then repositioned in on the base of the saw. Tools, such as hex drivers are required to remove the assembly from the base and to remove and reposition the specimen in the chuck. Fasteners in the assembly are then tightened, again using tools to secure the assembly along the T-slot in the base. Removing and repositioning the specimen in the chuck is required so that the cut is made in the proper location on along the specimen.

In operation, the saw blade is then manually positioned to affect the cut. In some known saws, the blade is moved toward the specimen to perform the cut. The location of the blade relative to the specimen may have to be manually adjusted along one or more of the x-, y- and z-axes to properly position the blade to perform the cut. Some saws in corporate automated movement in one or two directions. Other saws have a table or mounting that moves in one direction. For purposes of the present disclosure, the x-axis is parallel to the axis on which the saw blade rotates, the y-axis is perpendicular to the x-axis and is movement toward and away from the saw blade cutting edge, and the z-axis is along a vertical direction, that is in an up and down motion, toward and away from the saw base. The three axes are perpendicular to one another and define a spatial movement.

A lubricant and rinse solution, which may be, for example, water, is sprayed onto the blade and specimen during cutting operations to cool the specimen and blade and to rinse away debris and swarf that is generated during the cutting operation. The rinse water is collected in a collection tank in the bottom of the saw base. The rinse fluid is then pumped out of the recirculation tank for processing and/or disposal.

In known saws, the collection tank includes a serpentine or maze-like set of walls to reduce turbulence in the rinse fluid so that the heavier materials settle out prior to the discharge pump inlet. While these walls prevent some of the debris from entering the pump, these unwanted materials can clog the pump inlet resulting in overflow of the tank and can possibly cause the pump to run dry. Moreover, if debris is drawn into the pump, it may damage the pump internals, such as the pump casing or pump impeller.

In addition, depending upon the type of blade used, the blade may have to be dressed during the cutting operation. Dressing a blade is the process of removing worn material from the blade so as to expose a fresh cutting surface or edge. In known saws, dressing is carried out by positioning a dressing stick, such as a silicon carbide block, in a holder and moving the dressing stick into contact with the cutting edge of the blade. In one known saw, the dressing stick is driven by a drive into contact with the edge of the saw blade. The dressing stick may be incrementally moved, along its length to expose fresh (uncut) areas of the dressing stick to the saw blade edge. Such a system in used in the IsoMet® 4000 and 5000 linear precision saws, commercially available from Buehler, an ITW company, of Lake Bluff, Ill. The dressing stick must be manually installed on and removed from the saw by removing fasteners securing the holder to the saw and reinstalling the fasteners, using tools, to reposition and/or replace the stick.

Known saws have control system that control one or more of the steps necessary to carry out cutting, dressing and the like throughout the cutting cycle. The control interfaces, however, can be non-intuitive and may require significant operator interface or manual operation. In addition, the human-machine interfaces of known saws do not lend itself to step-by-step set up and operation in an automatic mode.

Accordingly, there is a need for an improved bench-top sample preparation saw. Desirably, such a saw has automated 3-dimensional movement and adjustability along the x-, y- and z-axes. More desirably, such a saw has tool-less specimen clamping and positioning assemblies to facilitate readily positioning and securing a specimen in the saw. More desirably still, such a saw has a dressing system that moves a dressing wheel into contact with the blade and indexes the dressing element to expose a fresh surface of the dressing element to the blade. Still more desirably, such a saw has a recirculation tank and system that readily separates debris and swarf from the cooling/lubricating/rinse fluid. Such a saw additionally includes an improved user interface that facilitates set up and use of the saw with minimal operator interface requirements.

SUMMARY

A sample preparation saw has automated 3-dimensional movement and adjustability along the x-, y- and z-axes. In an embodiment, the saw has tool-less specimen clamping and positioning assemblies to facilitate readily positioning and securing a specimen in the saw. In an embodiment, the saw has a dressing system that moves a dressing wheel into and out of contact with the blade and indexes the dressing wheel to expose a fresh surface of the dressing element to the blade. In an embodiment, the saw has a recirculation tank and system that readily separates debris and swarf from the rinse fluid.

The saw includes a base, a housing, a saw assembly mounted to the base, a dressing assembly, a sample clamping assembly mounted to the base, and a reservoir assembly. The saw assembly includes a blade assembly with a rotating blade (also known as, e.g., a cutting blade or a saw blade). The blade assembly is movable along x-, y- and z-axes by at least two drives. The dressing assembly is operable to dress the rotating blade. The sample clamping assembly includes a rail, a sample mount removably positioned on the rail and a saddle operable to hold a sample. The reservoir assembly is operable to recirculate a rinse fluid sprayed on the rotating blade, and includes a basin having a pump and a series of weirs.

The saw includes a first drive for moving the blade assembly along the x-axis, a second drive for moving the blade assembly along the y-axis and a third drive for moving the blade assembly along the z-axis.

In an embodiment, the saw assembly includes a turret assembly and the first drive and the third drive are mounted to the turret assembly. The second drive moves the turret assembly, mounted on a conveyor, along the y-axis. A telescopic shaft imparts rotational movement to the rotating blade, and a blade drive rotationally drives the rotating blade via the telescopic shaft. The first drive moves the blade assembly by reciprocating movement of a telescopic shaft.

In an embodiment of the present invention, the saw includes a dressing assembly mounted to the blade assembly and movable with the blade assembly along the one or more of the x-axis, the y-axis and the z-axis. The dressing assembly includes a rotatable dressing wheel and a pivoting mount for pivoting the dressing wheel into and out of contact with the rotating blade. The dressing wheel is rotated in an indexed manner so as to expose an unused portion of the dressing wheel to the rotating blade.

In an embodiment, the dressing assembly includes a pivot drive for pivoting the dressing wheel into and out of contact with the rotating blade and a dressing wheel drive for rotating the dressing wheel.

In an embodiment of the present invention, the saw includes a sample clamping assembly. The clamping assembly includes a rail mounted to the base, a sample mount that removably positions on the rail and a saddle operably connected to the sample mount, by, for example, a post. The rail has a main body, a lip extending from an upper portion of the main body on a side of the main body and a recess on an opposite side of the main body, below the upper portion. The mount includes a body having a channel defined by a long leg and a short leg. The short leg has an inwardly oriented lip for engaging the rail lip and a biased securing element, such as one or more biased ball detents. When the sample mount is positioned on the rail the main body inwardly oriented lip engages the rail lip and the ball detents are positioned in the recess to secure the mount to the rail.

To facilitate mounting the rail lip can be rounded and a surface extending between the rail upper surface and the recess (along which the ball detents are urged) can be angled. The mount can be positioned on and removed from the rail without the use of tools.

In an embodiment, the saddle includes a base having three threaded openings, a movable center bar having a pair of non-threaded openings that are aligned with two of the threaded openings in the base and a clamp having a pair of slotted openings aligning with the non-threaded openings in the center bar. The movable center bar is positioned between the base and the clamp.

A pair of fasteners secure the movable center bar and clamp to the base and a threaded adjusting rod positioned in one of the threaded openings in the base. The adjusting rod is configured to contact and move the movable center bar toward and away from the clamp to secure and release a sample held in the saddle. The slotted openings in the clamp may have a generally U-shaped profile. A resilient insert can be positioned to extend into the slotted opening to secure the clamp to the fasteners.

In an embodiment of the present invention, a reservoir system includes a basin having a removable cover having a fluid inlet. The basin has a pump positioned therein. The basin and the saw have quick connect connectors.

The reservoir system has a series of weirs extending across a width of the basin. Each of the weirs has a height such that the height of an upstream weir is greater than the height of a downstream weir. Quick connect connectors provide power and control to the pump and fluid outlet connection so that the reservoir system is positioned in and removed from a receiving region of the base of the saw without the use of tools. Each of the weirs defines a section within the basin and screens can be positioned in the sections.

The saw includes a controller. The controller can be configured to allow all or some of the functions or operation of the saw in an automatic mode or in a manual mode.

These and other features and advantages of the present disclosure will be apparent from the following detailed description, in conjunction with the appended claims.

BRIEF DESCRIPTION OF THE DRAWINGS

The benefits and advantages of the present device will become more readily apparent to those of ordinary skill in the relevant art after reviewing the following detailed description and accompanying and drawings, wherein.

DETAILED DESCRIPTION

Figure 1:
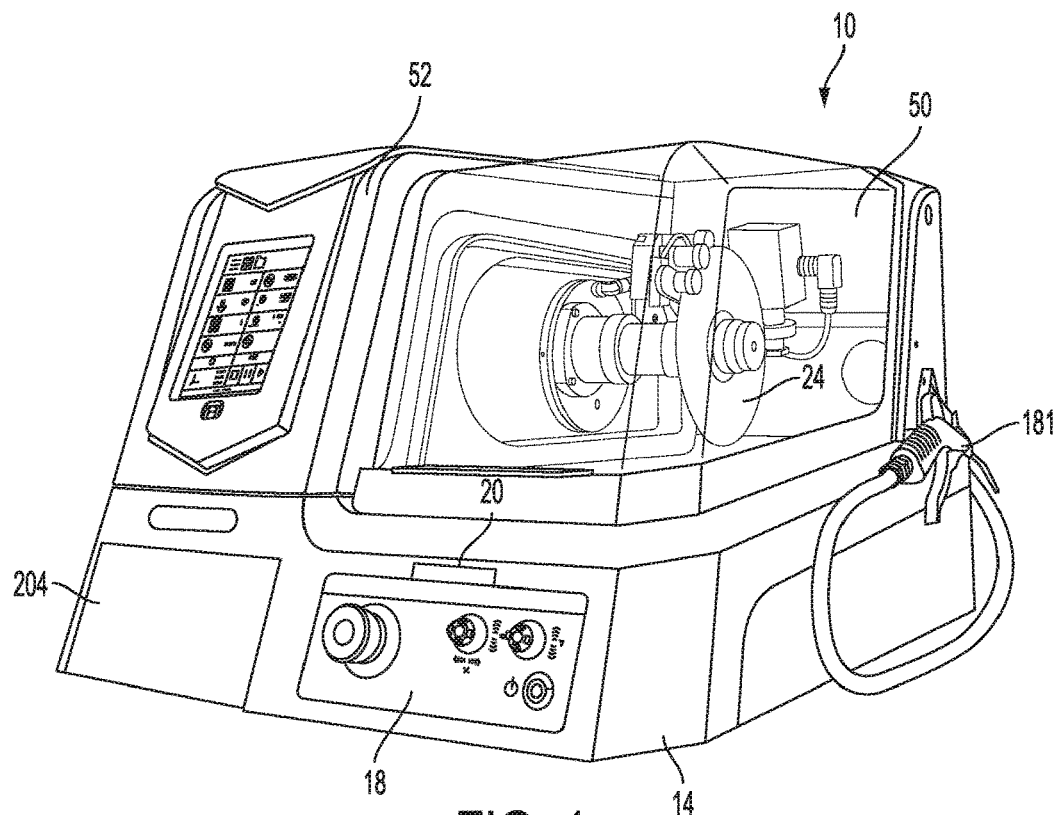
FIG. 1 is perspective view of an embodiment of a sample preparation saw of the present invention.

While the present device and method are susceptible of embodiment in various forms, there is shown in the drawings and will hereinafter be described presently preferred embodiments with the understanding that the present disclosure is to be considered an exemplification of the device and is not intended to be limited to the specific embodiments illustrated.

Figure 2:
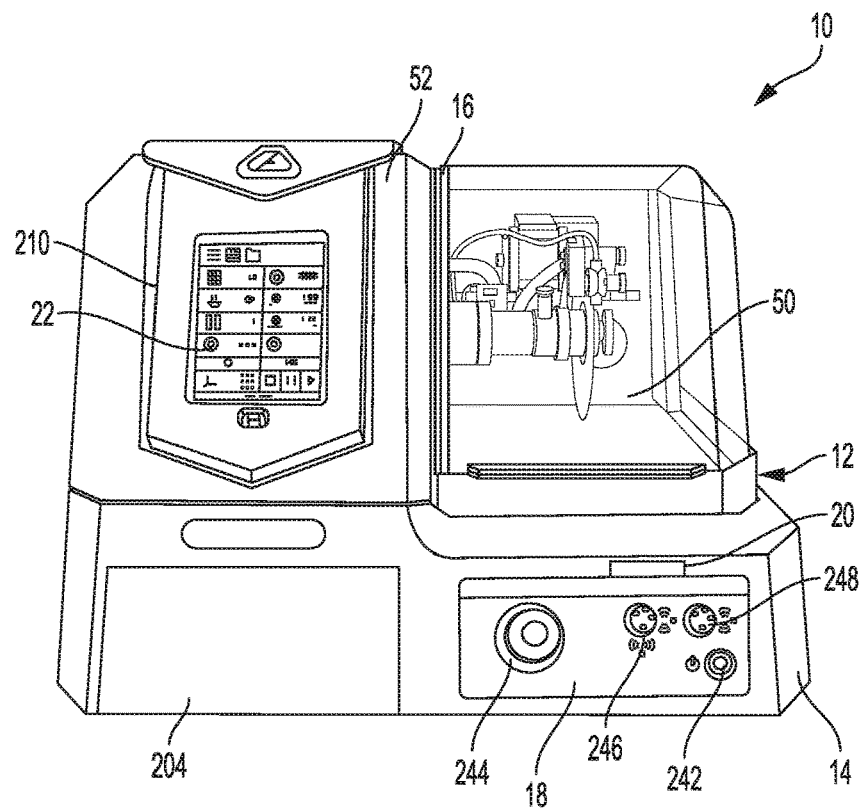
FIG. 2 is front view of the saw of FIG. 1.

Referring now to the Figures and in particular, to FIGS. 1-2, there is shown an embodiment of a sample preparation saw 10. The illustrated saw 10 is a bench-top type saw that is configured to rest on a surface, such as a bench or table. It will, however, be appreciated that the novel features and aspects of the presently described embodiment can used in any sample preparation saw 10.

Figure 19:
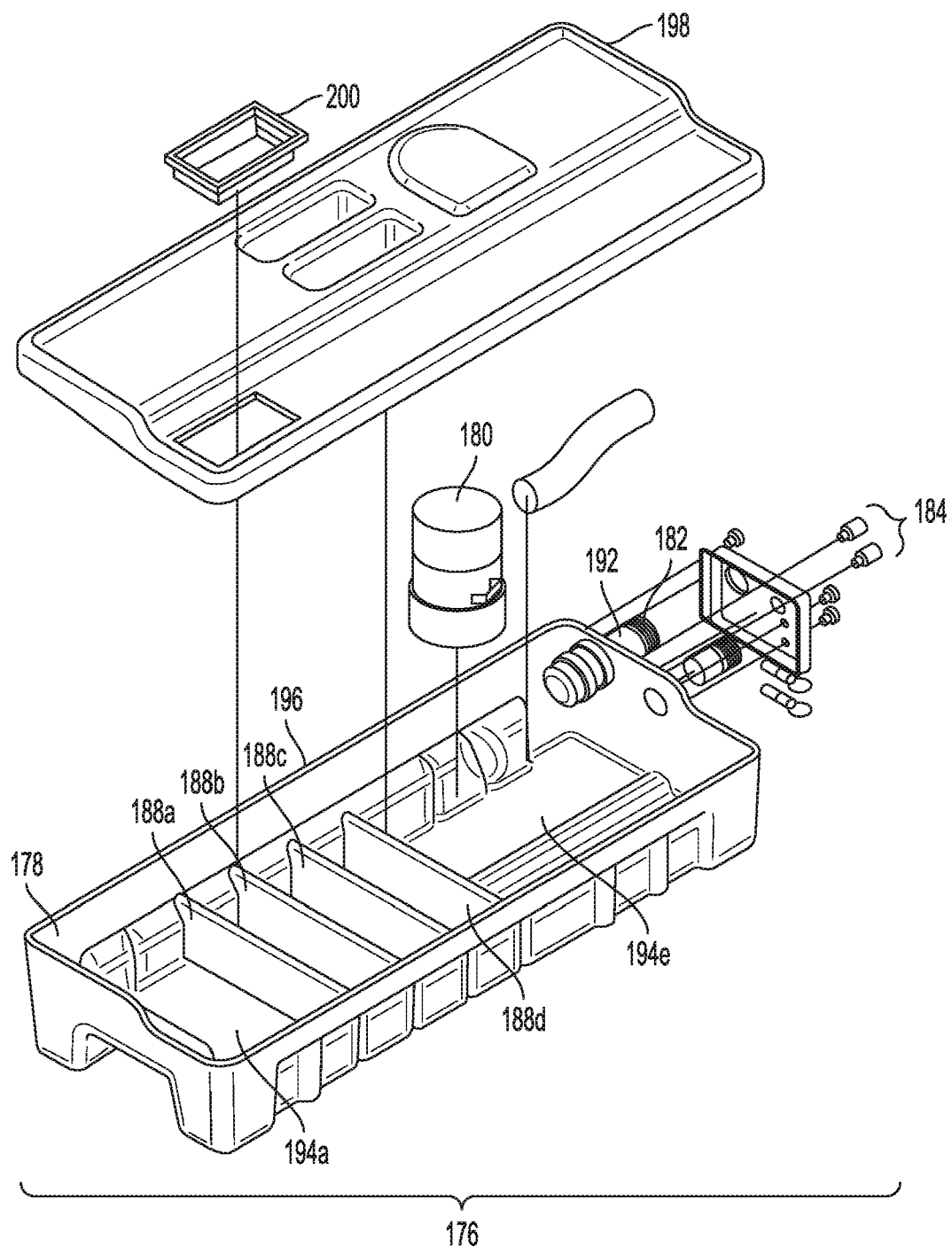
FIG. 19 is an exploded view of an embodiment of a reservoir system of the present invention.

The saw 10 includes a housing 12 having a base 14 and a cover 16. The saw 10 can also be described as having a cutting region 50 and a drive region 52. As illustrated, the cover 16 can include a transparent portion to allow for viewing the saw 10 and the specimen or sample during operation. The base 14 includes a receiving section 204 for a reservoir system (more detail with respect to FIGS. 19-21 below). As seen in FIGS. 1-2 and 22, the saw 10 includes a control panel 18, a controller 20 and a graphical user interface (GUI) 22. In an embodiment, the GUI 22 is a touch screen that is in communication with the controller 20 to control and monitor operation of the saw 10.

Figure 3:
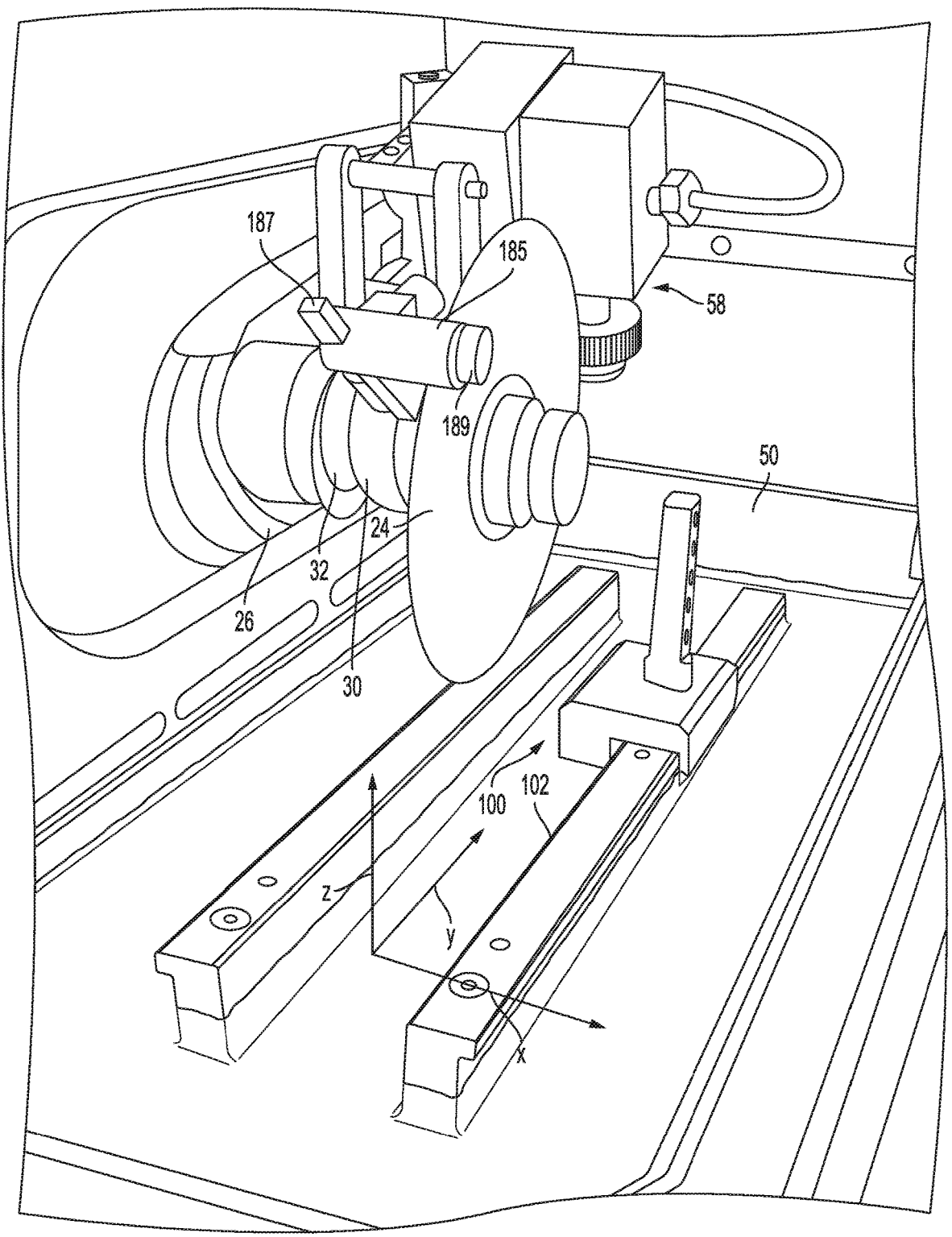
FIGS. 3 and 4 are perspective views of a cutting region of the saw.
Figure 4:
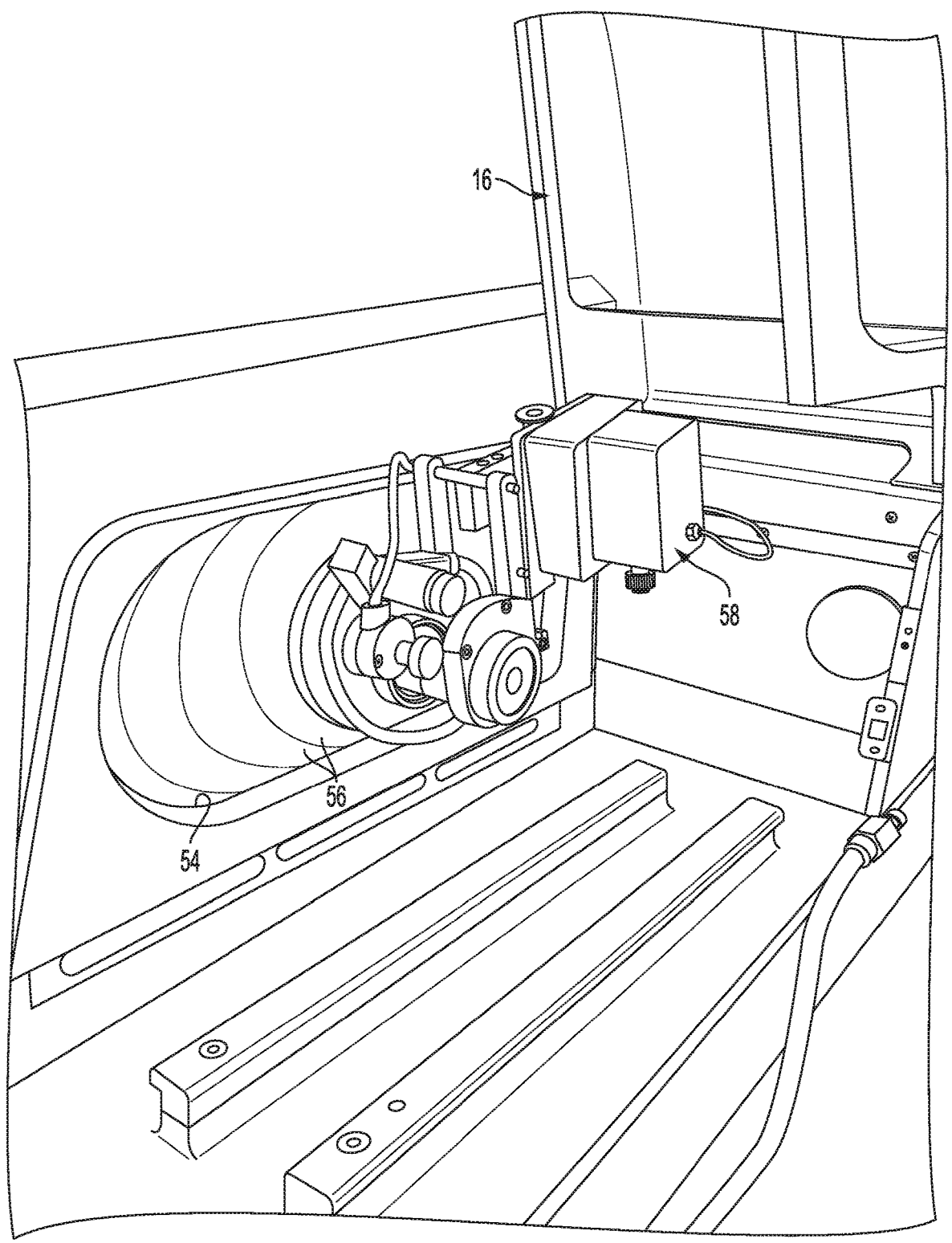

Referring to FIGS. 3-4, illustrating a cutting region 50 of the saw 10, a rotating blade 24 of the saw 10 has automated, independent 3-dimensional movement and adjustability, i.e., along the x-, y- and z-axes (see FIG. 3). For purposes of the present disclosure, the x-axis is the direction that is parallel to the axis of rotation of the blade 24, the y-axis is the direction that is perpendicular to the axis of rotation of the blade 24 and the z-axis is also a direction that is perpendicular to the axis of rotation of the blade 24, in which the x- and y-axes are oriented horizontally and the z-axis is oriented vertically. Again, for purposes of the present disclosure, the x-axis is in the direction across the saw 10, that is side-to side, the y-axis is to the front and rear of the saw 10 (toward and away from an operator) and the z-axis is up and down in the saw 10. It will be appreciated that movement along the x-, y- and z-axes provides independent 3-dimensional movement and positioning of a rotating blade 24 relative to the sample without the need to remove the sample from a saddle (or vise) and reposition the sample within the saddle and saw for subsequent cutting.

The saw 10 includes a turret assembly 26 (more detail with respect to FIGS. 5A-8B below), primarily located in a drive region 52 of the saw 10. The turret assembly 26 is movable along the y- and z-axes as will be discussed in more detail below. The rotating blade 24 is carried on a blade assembly 30 at the end of a drive shaft 32 (also known as, e.g., a telescoping/telescopic shaft 32). The blade assembly 30 includes a blade drive 28 for rotationally driving the rotating blade 24 (also known as, e.g., the saw blade 24) via the drive shaft 32. The blade drive 28 can be, for example, a direct drive motor or the drive can include a drive train, for example a belt drive train between a motor and the saw blade 24. In an embodiment, the blade drive 28 is a variable speed drive that allows the rotational speed of the blade 24 to be controlled depending, for example, on the size, e.g., thickness, of the sample, the sample material and the like. The blade drive 28 and blade assembly 30 are eccentrically mounted to the turret assembly 26.

The telescopic shaft 32 reciprocates to allow for adjusting the distance between the blade 24 and the turret assembly 26, or the distance along the x-axis that the blade 24 is positioned. A drive shaft sleeve 34 is positioned over the telescopic shaft 32 to cover the shaft 32. The sleeve 34 moves along the x-axis with the blade assembly 30, but is stationary in that it does not rotate with the telescopic shaft 32.

Figure 5A:
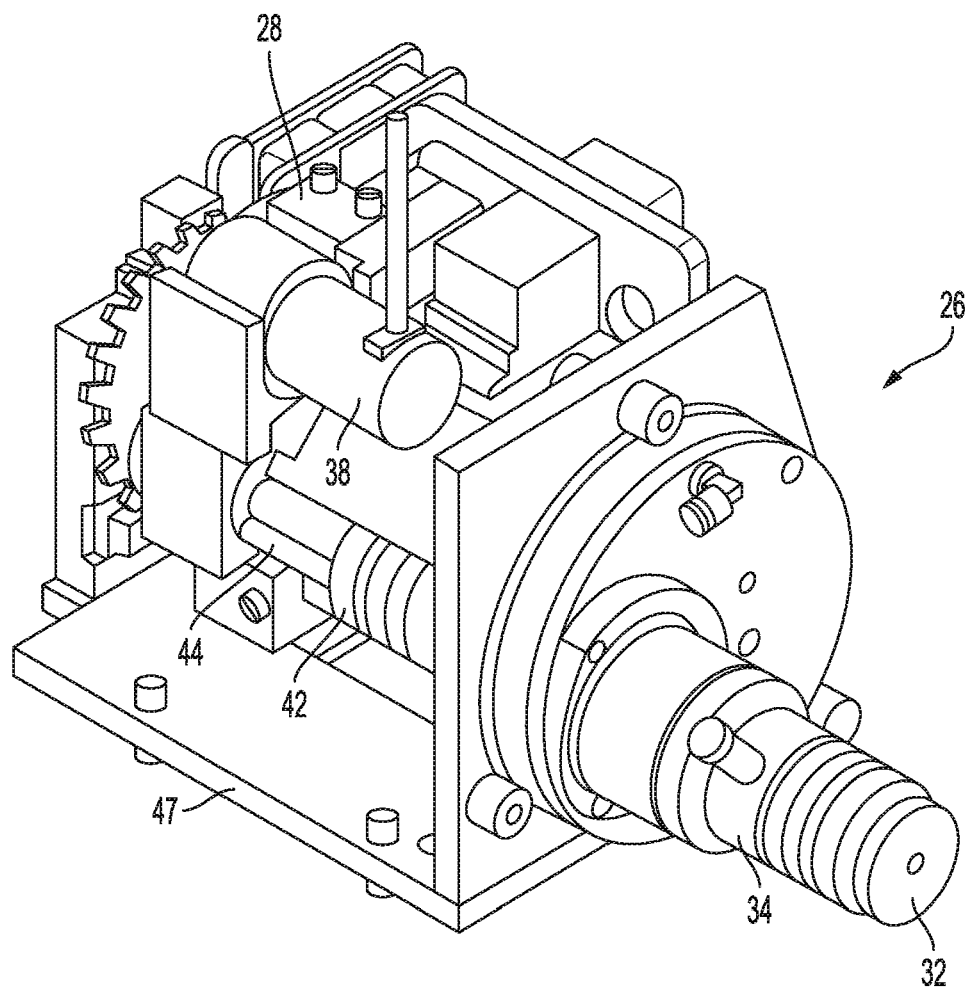
FIGS. 5A-5E are various views of an embodiment of a turret assembly of the present invention.
Figure 5B:
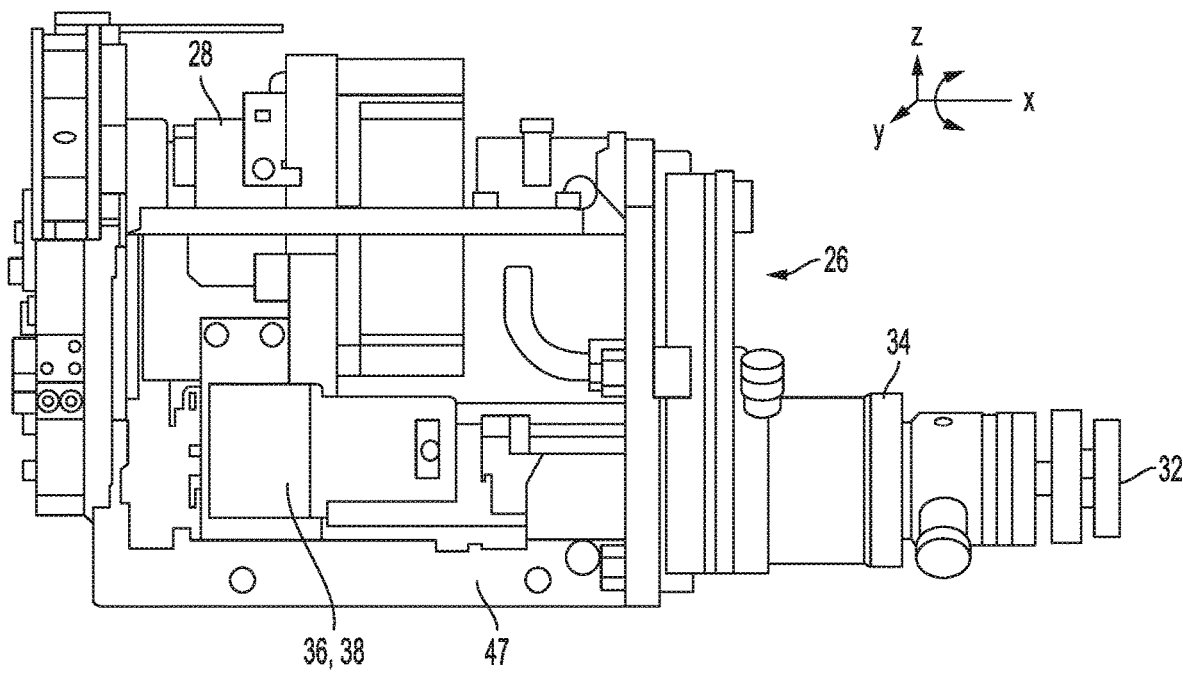
Figure 5C:
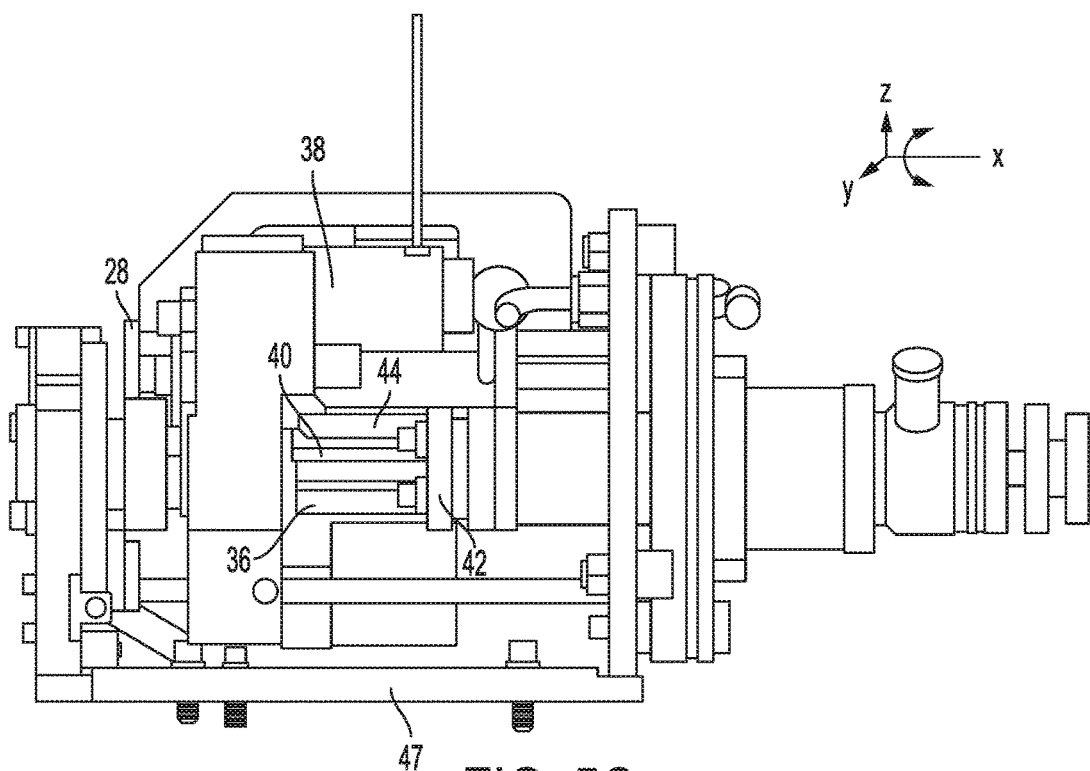
Figure 5D:
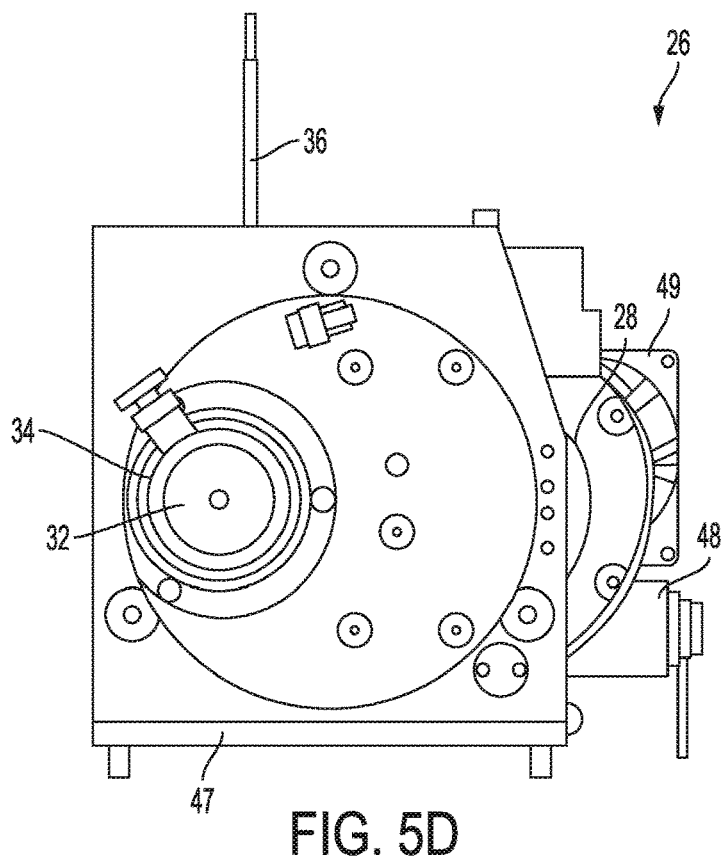
Figure 5E:
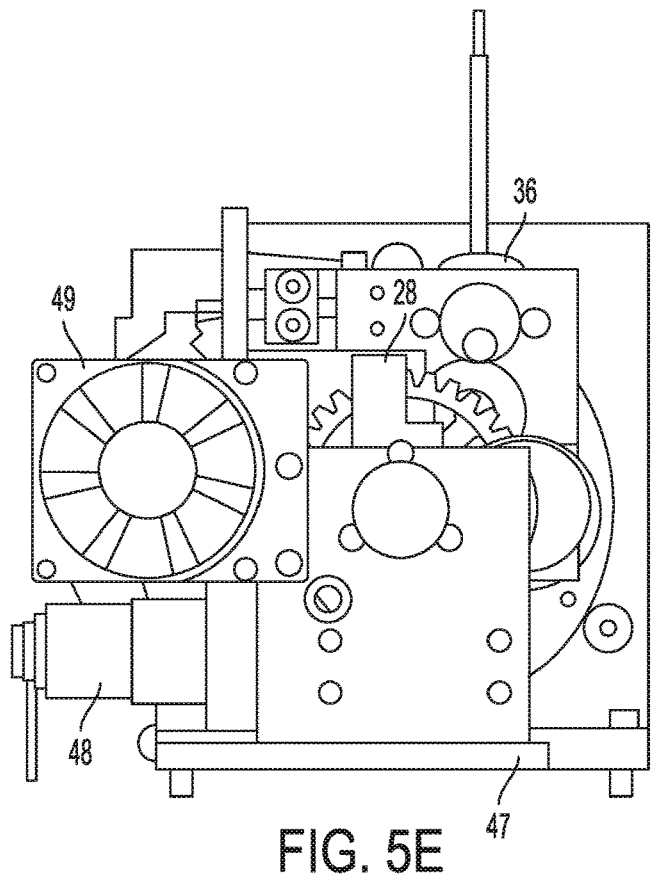
Figure 6A:
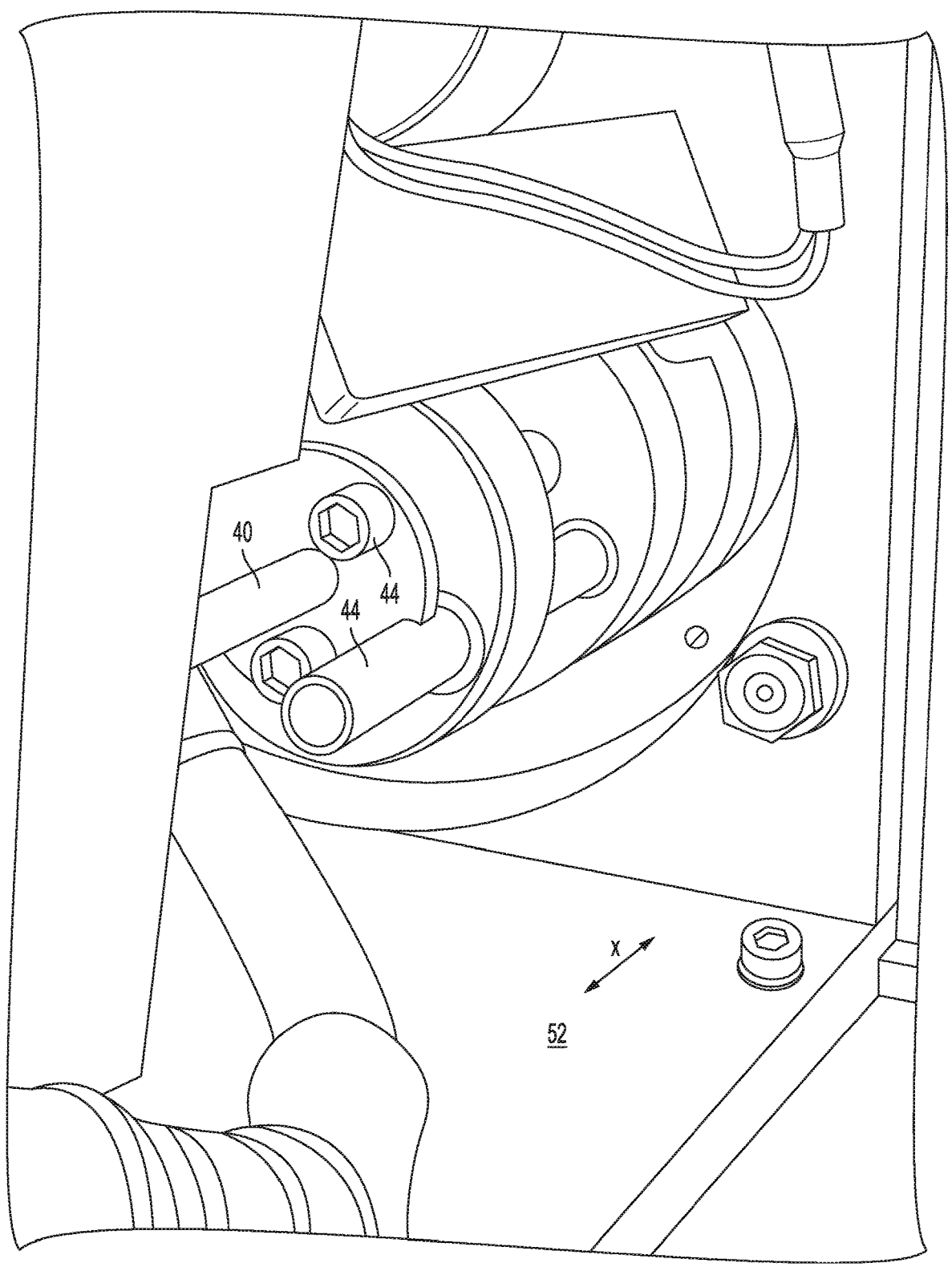
FIGS. 6A and 6B are serial perspective views of a drive region of the saw showing a portion of the turret assembly as it reciprocates.
Figure 6B:
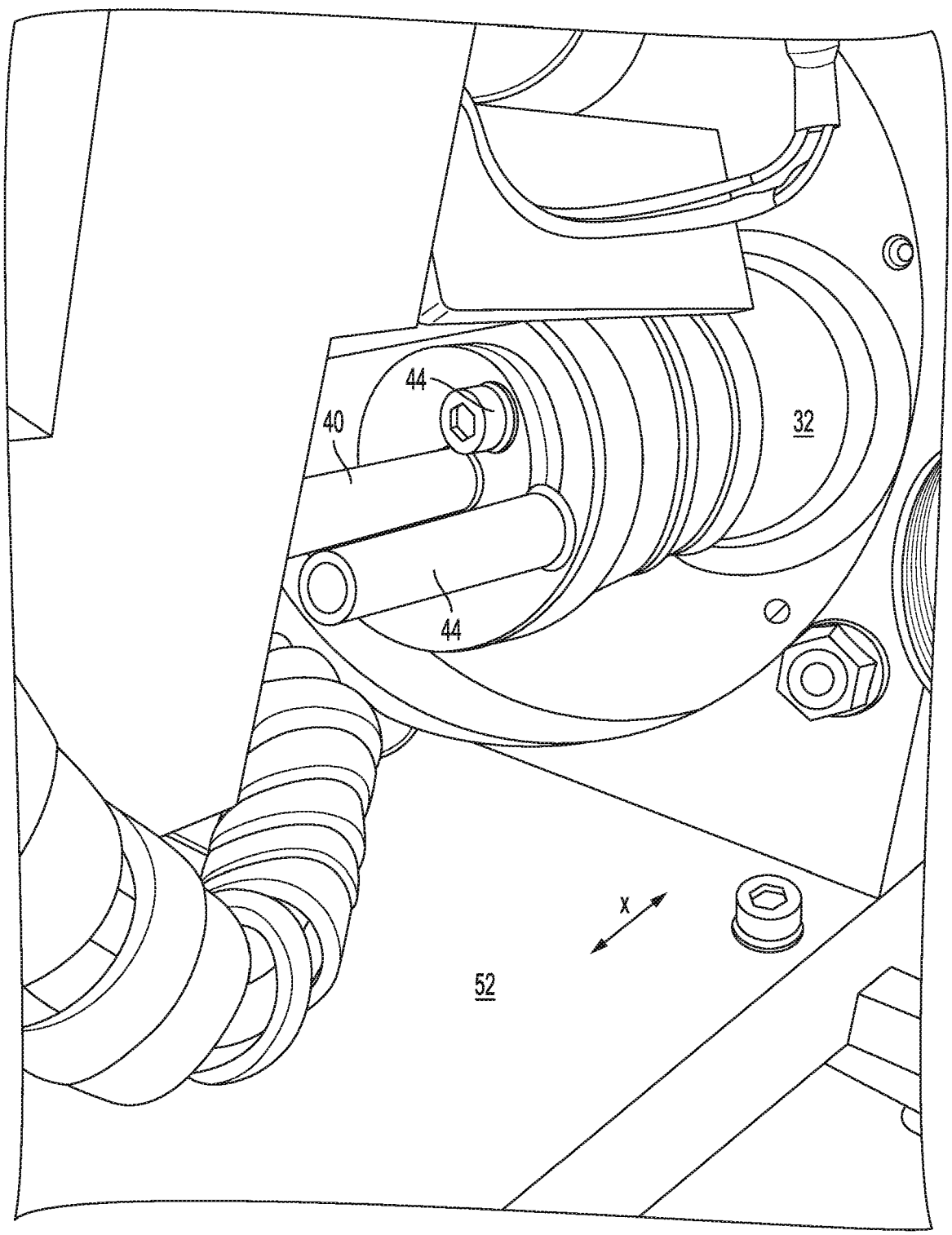

FIG. 5A illustrates a perspective view, FIG. 5C illustrates a front view, FIG. 5D illustrates a right-side view, and FIG. 5E illustrates a left-side view of the turret assembly 26. FIG. 5B illustrates a back view of the turret assembly 26, with some rotation of the shaft 32 about the x-axis in an arcuate movement down the z-axis towards a turret base 47 in comparison with FIGS. 5A and 5C-5E. FIGS. 6A and 6B illustrate serial perspective views inside the drive region 52 of the saw 10 and the turret assembly 26. The telescopic shaft 32 (guided by parts 40-44) is extended along the x-axis into the cutting region 50 between FIGS. 6A and 6B.

Figure 7:
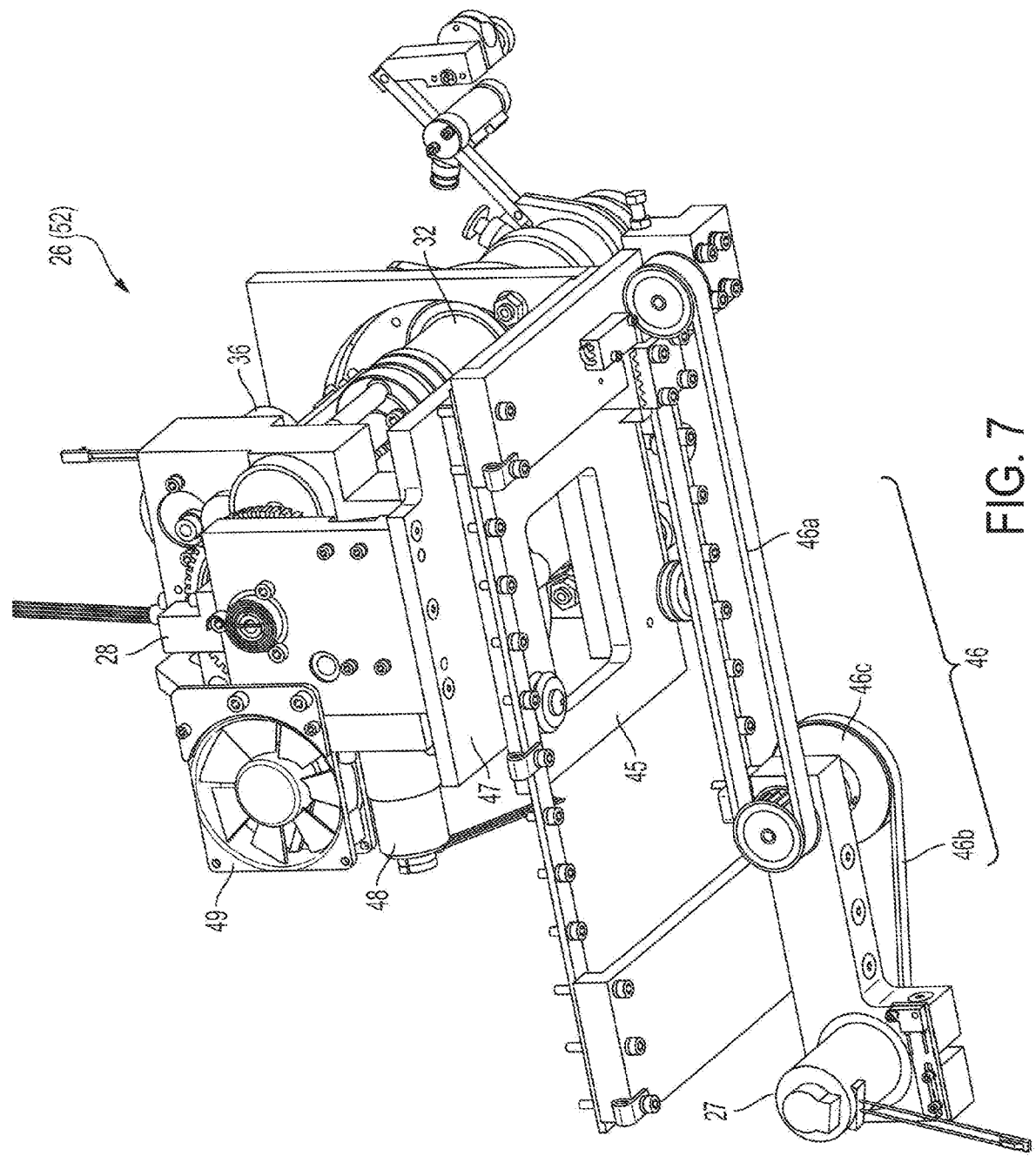
FIG. 7 is an assembly view of the drive region of the saw showing a conveyor on which the turret assembly is mounted.
Figure 8A:
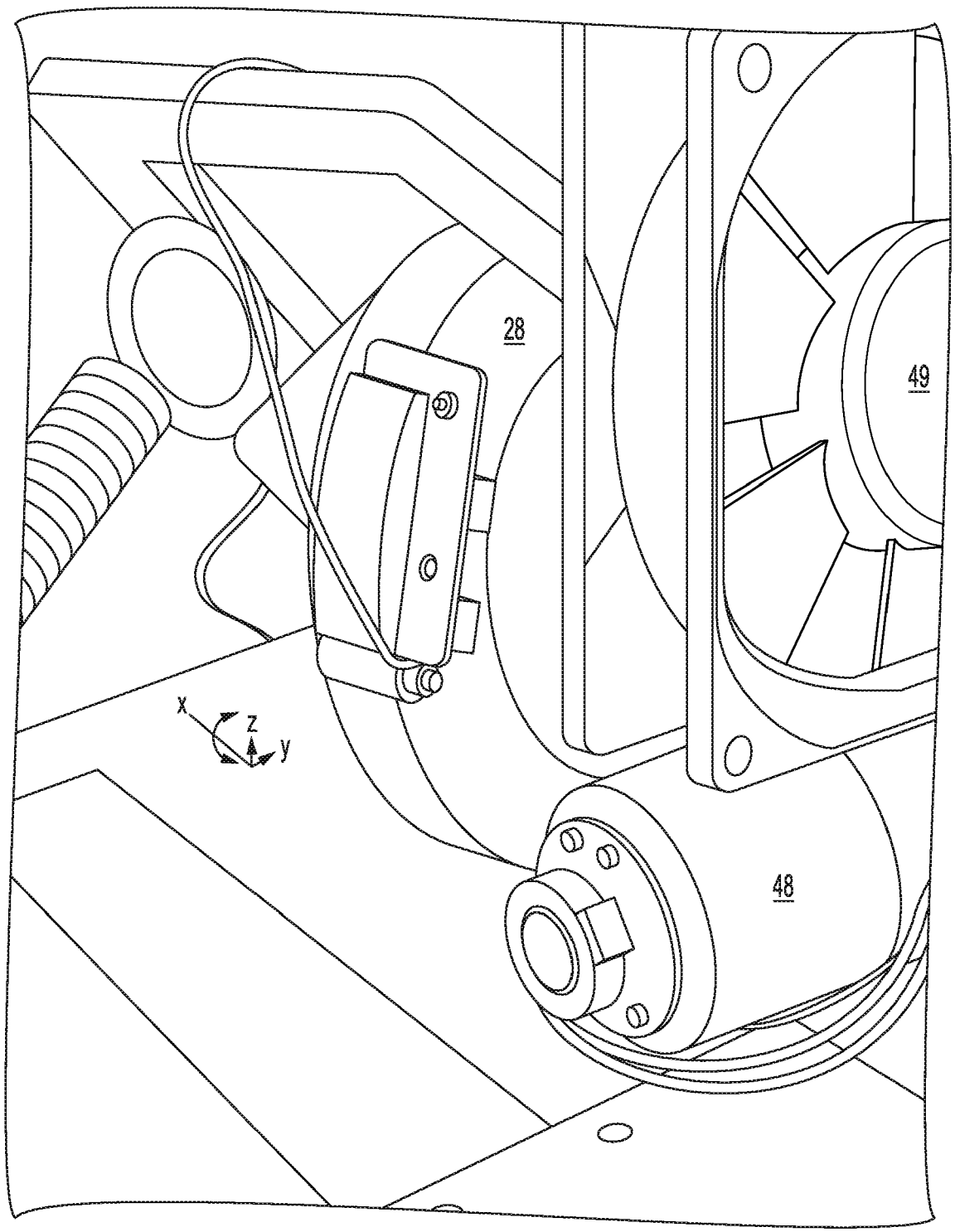
FIGS. 8A and 8B are serial perspective views of the drive region of the saw showing a portion of the turret assembly as it rotates.
Figure 8B:
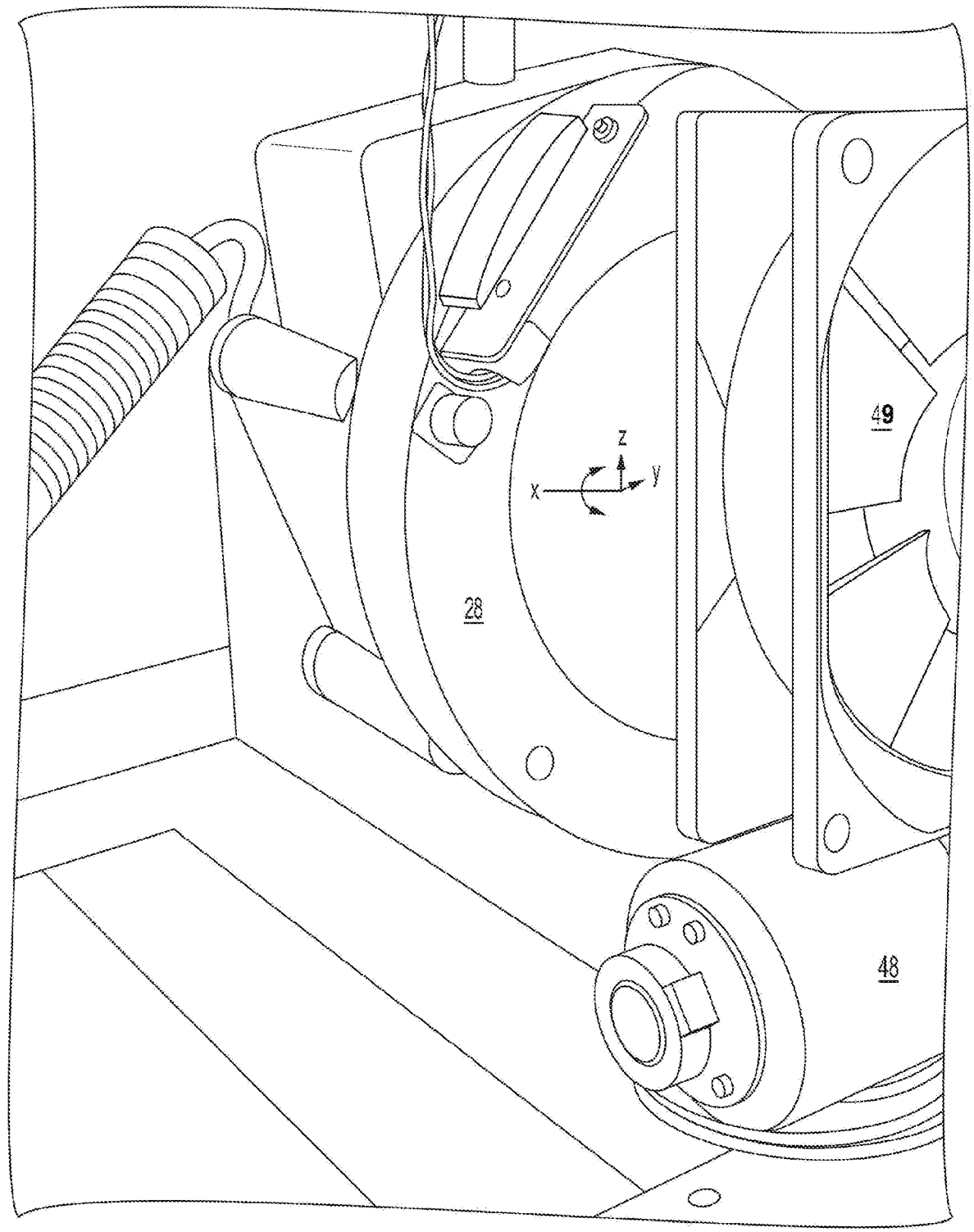
Figure 9A:
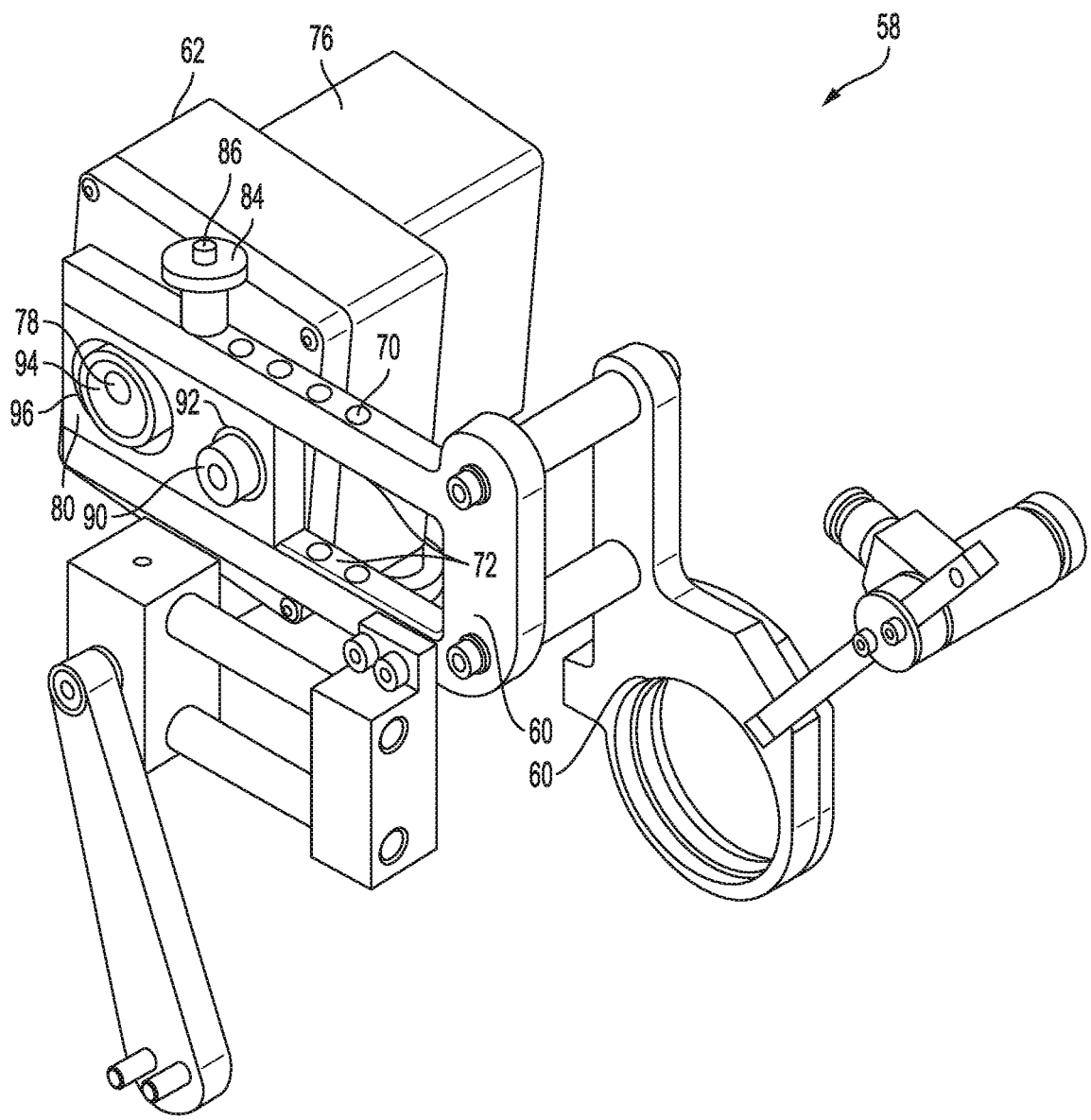
FIGS. 9A-9C are various views of an embodiment of a dressing assembly of the present invention.
Figure 9B:
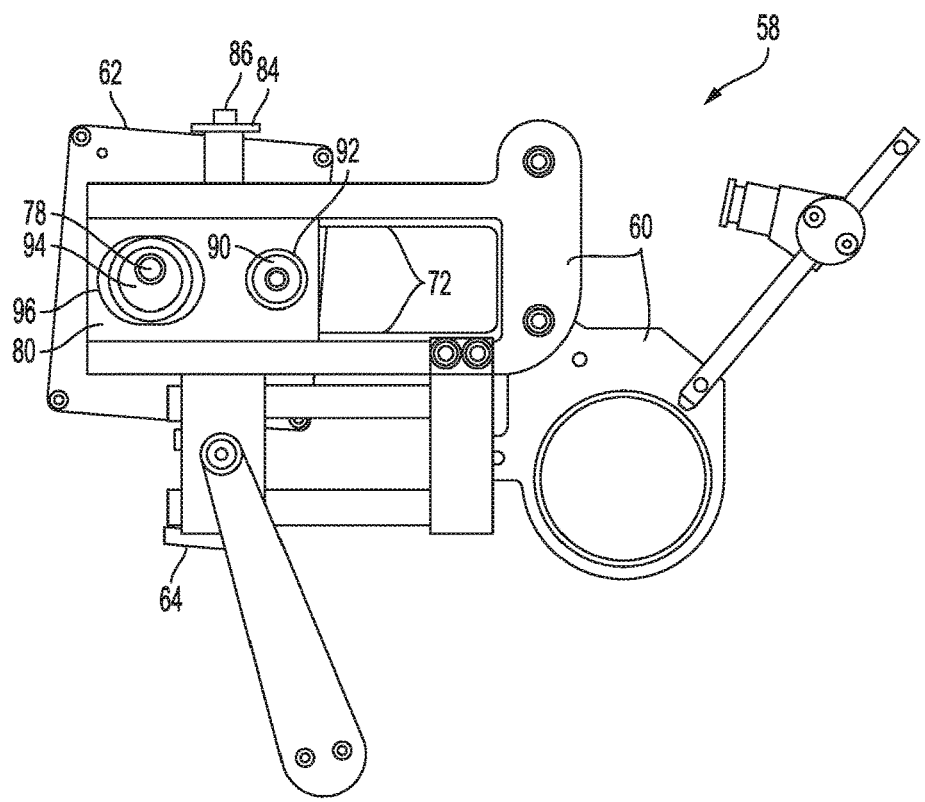
Figure 9C:
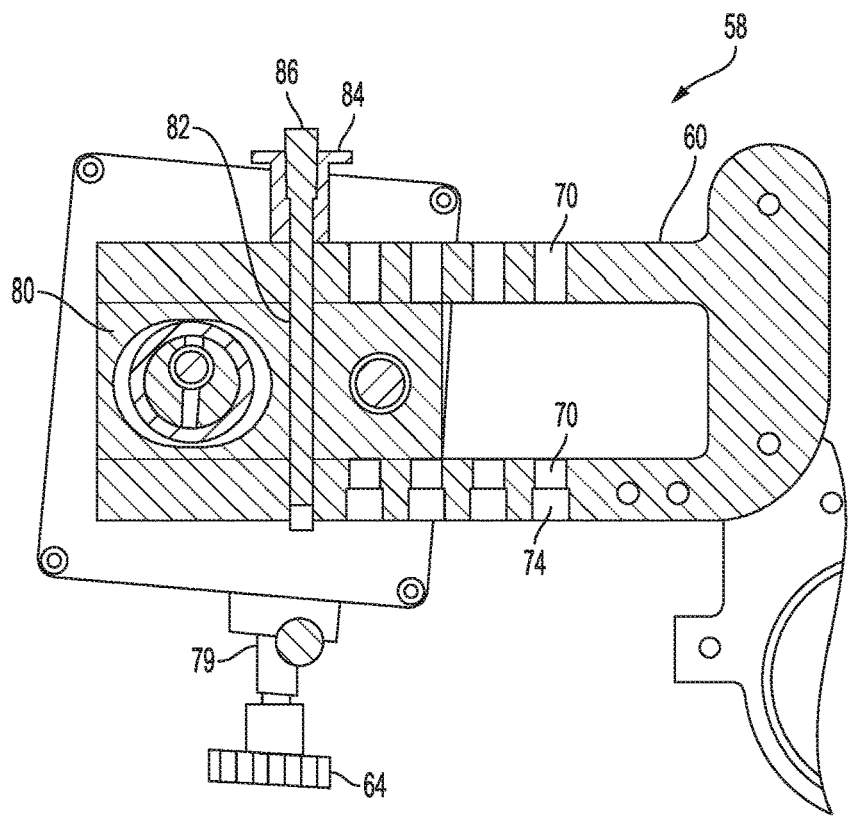
Figure 10:
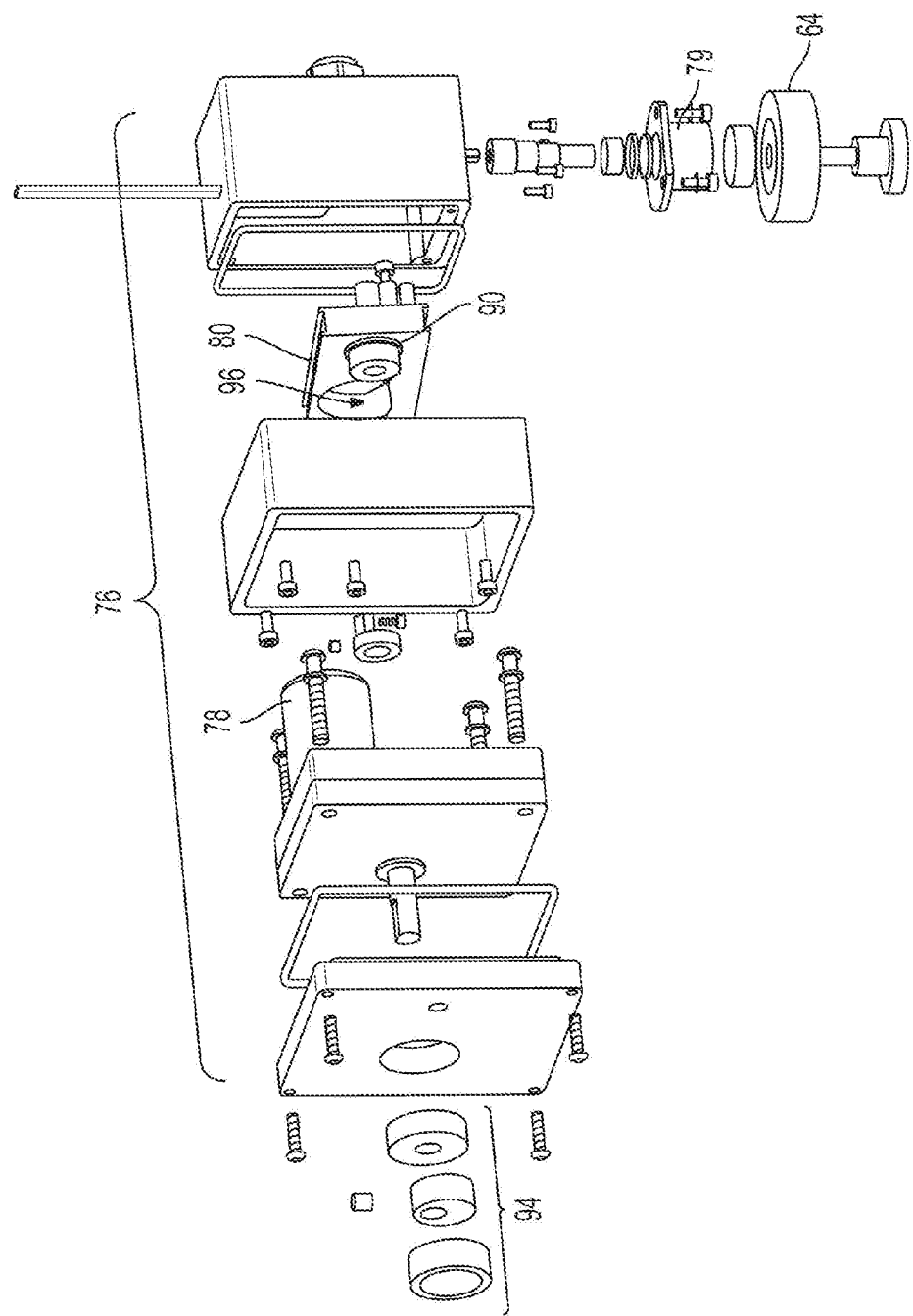
FIG. 10 is an exploded view of the dressing assembly.
Figure 11:
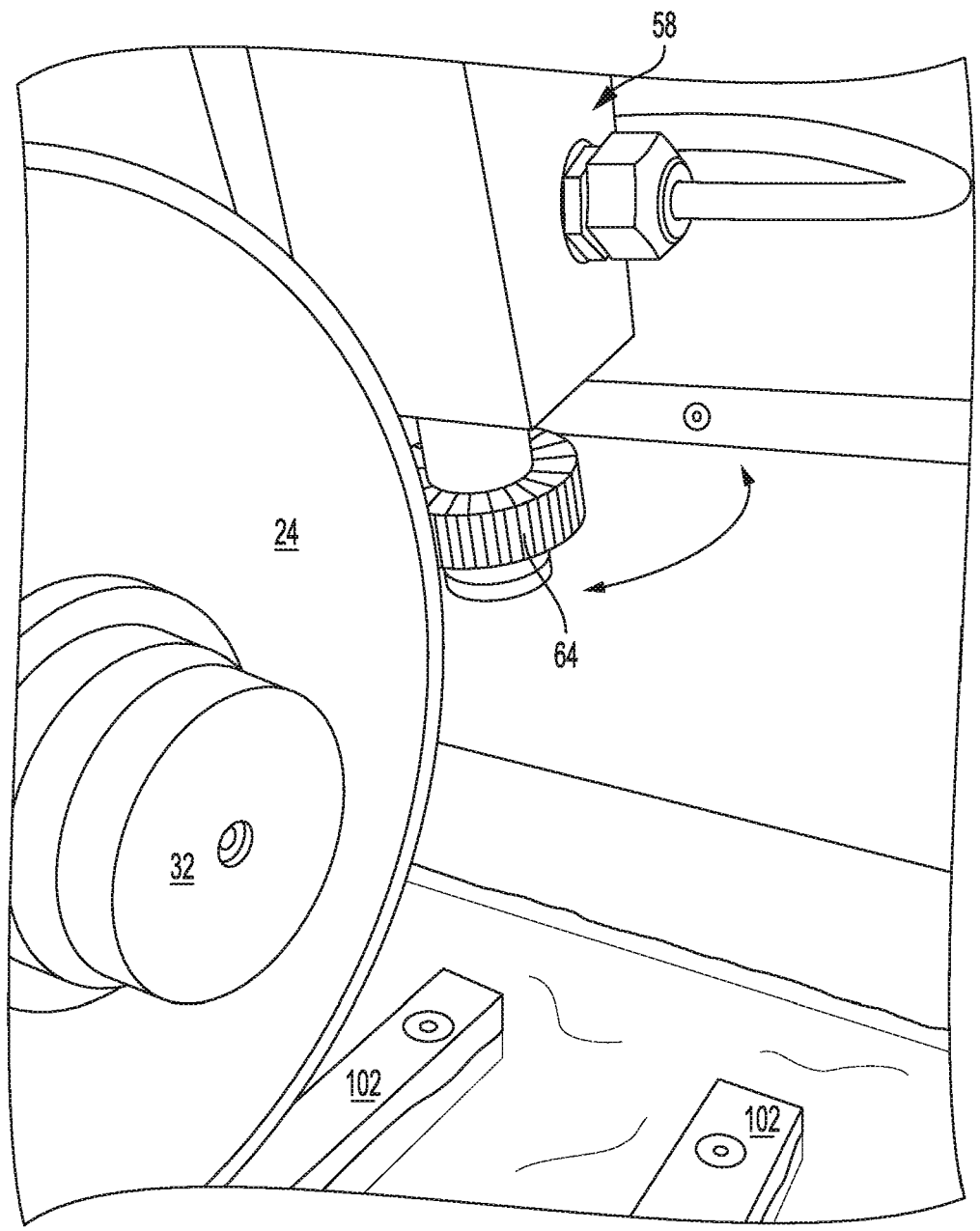
FIG. 11 is a perspective view showing the dressing assembly contacting the rotating blade.
Figure 12A:
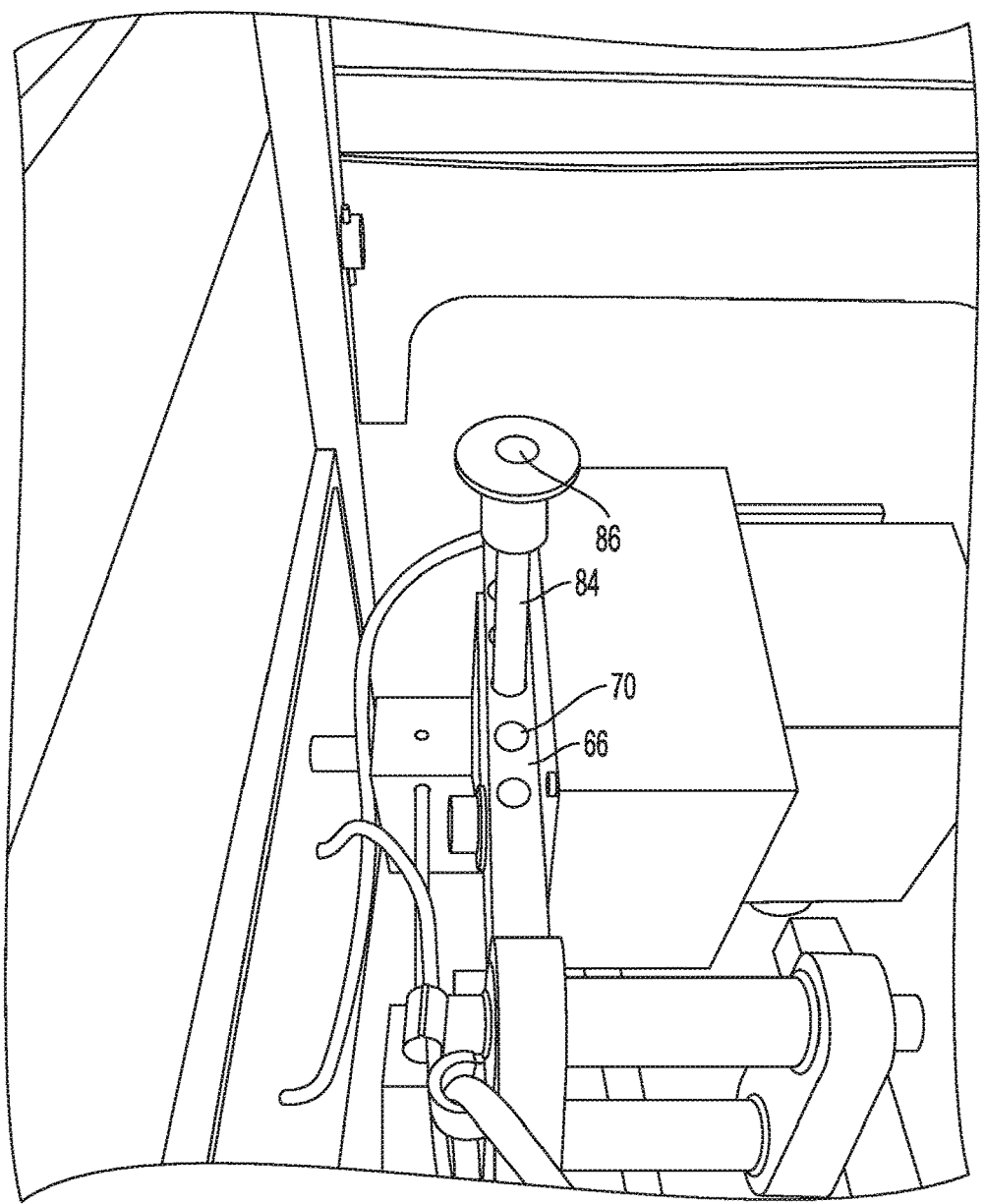
FIGS. 12A and 12B are perspective views of a dressing assembly mount.
Figure 12B:
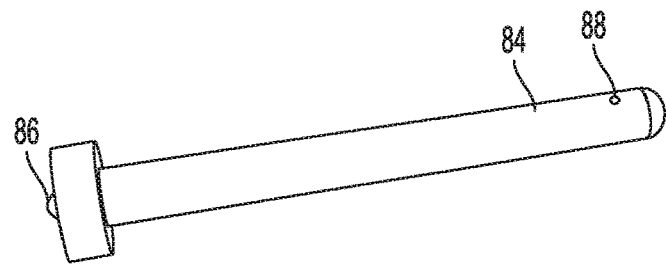
Figure 13A:
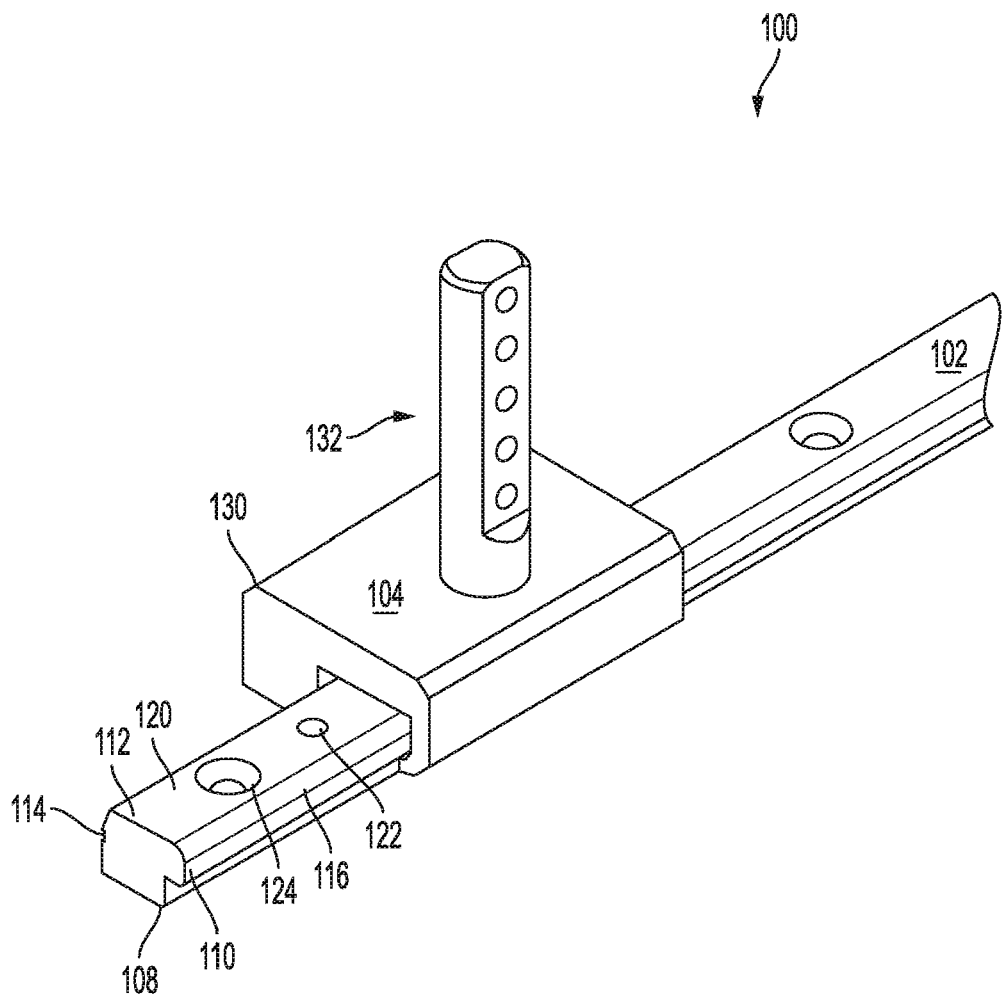
FIG. 13A is a perspective view of an embodiment of a sample clamping assembly of the present invention.
Figure 13B:
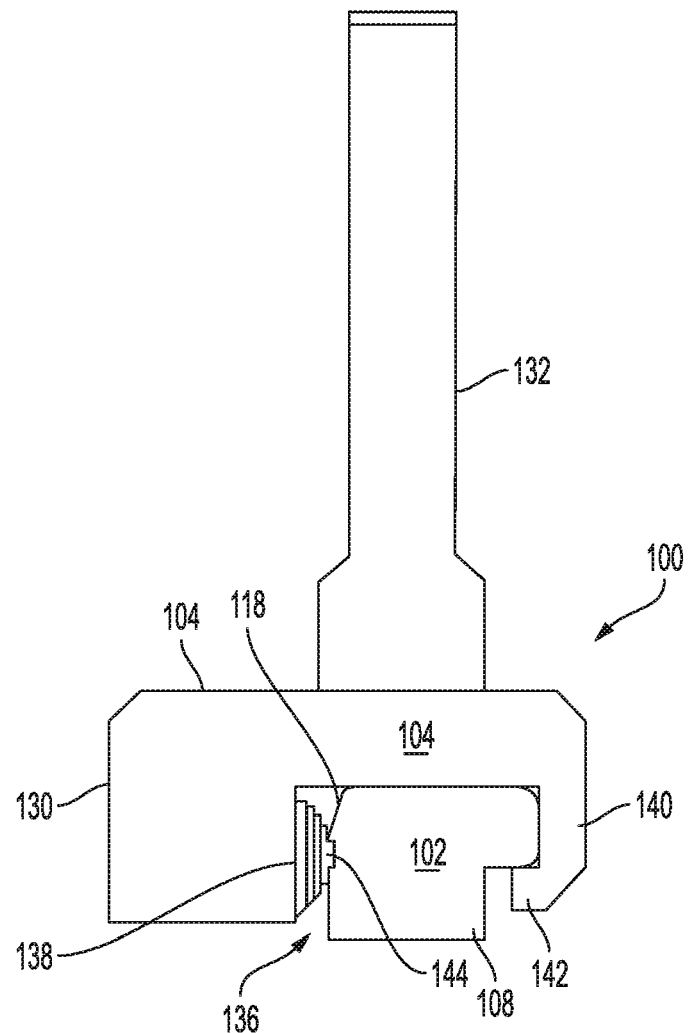
FIG. 13B is a front view of the sample clamping assembly of FIG. 13A.
Figure 14:
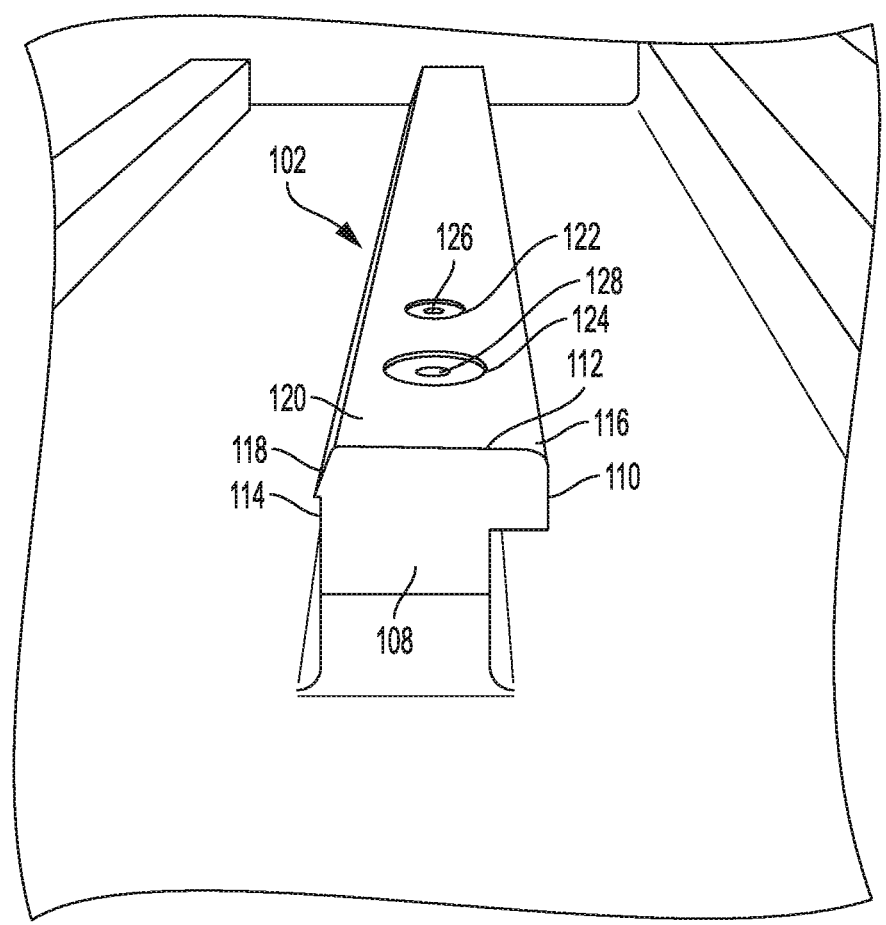
FIG. 14 is a perspective view of an embodiment of a rail of the sample clamping assembly.

FIG. 7 illustrates an assembly view of the drive region 52 of the saw 10 showing a conveyor 46 on which the turret assembly 26 is mounted. FIGS. 8A and 8B illustrate serial perspective views inside the drive region 52 of the saw 10 and the turret assembly 26. A rotational drive 48 is rotating the blade drive 28 about the x-axis in an arcuate movement up the z-axis away from base 47 between FIGS. 8A and 8B. Additionally, FIGS. 5D-5E, 7 and 8A-8B illustrate a blower fan 49 of the turret assembly 26. The blower fan 49 cools one or more drives of the turret assembly 26.

Referring now to FIGS. 5A-8B, with respect to movement along the x-axis, in an embodiment, a first or x-axis drive 36 for moving the blade assembly 30 along the x-axis is illustrated. The x-axis drive 36 is carried on the turret assembly 26. The x-axis drive 36 includes a motor 38 such as a stepper or servomotor to allow for precisely controlling the positioning of the rotating blade 24 along the x-axis. The motor 38 can be mounted to a drive rod 40 and drive plate 42 that are configured for reciprocating movement to move the blade assembly 30 along the x-axis, as well as rotational movement to drive blade 24 rotation. One or more guide pins 44 can extend from the blade assembly 30 through the drive plate 42 to rotatably drive the blade assembly 30 and to serve as a guide for reciprocating movement of the blade assembly 30 along the x-axis (as illustrated in FIGS. 6A and 6B). Thus, the shaft 32 and the blade 24 are rotated by the blade drive 28, and the shaft 32 and the blade assembly 30 are moved along the x-axis by the first drive 36.

In an embodiment, for movement along the y-axis, the turret assembly 26 is mounted to a driven conveyor 46. The conveyor 46 includes a first belt 46a, a second belt 46b, and a pulley 46c. A conveyor platform 45 is operably connected (e.g., but not limited to, via screws, welding, and/or adhesive) to the conveyor 46. A base 47 of the turret assembly 26 is mounted to the conveyor platform 45. A conveyor or y-axis drive 27 moves, e.g., rotates the conveyor 46 (i.e., rotates the second belt 46b which rotates the pulley 46c which rotates the first belt 46a) to move the conveyor platform 45 on which the turret base 47 is mounted, and thus the blade assembly 30 and blade 24, back and forth (front and back) in the saw 10. The conveyor drive 27 can be used to position the saw blade 24 during set up, prior to cutting, and during cutting to move the blade 24 toward and away from the sample. The conveyor drive 27 can be, for example, a stepper or servomotor to allow for precisely controlling the position of the blade 24 along the y-axis. Those skilled in the art will appreciate the numerous ways which conveyor 46 and parts 46a-46c can be configured and operated, and will recognize that the conveyor 46 can be implemented with either more or less belts/pulleys 46a-46c.

For movement along the z-axis, the turret assembly 26 includes a rotational or z-axis drive 48. Similar to the above-mentioned drives 27, 36, the rotational drive 48 can also be a precision drive, such as a stepper or servomotor to precisely control movement of the turret assembly 26. As noted above the blade drive 28 and the blade assembly 30 are eccentrically mounted to the turret assembly 26. As such, as the rotational drive 48 rotates the turret assembly 26, the blade drive 28 and the blade assembly 30 will move up and down (generally along the z-axis) as well as forward and back (along the y-axis) due to the nature of the arcuate path taken by the eccentrically mounted blade drive 28 and assembly 30, as illustrated in FIGS. 8A and 8B. In addition, similar to the conveyor drive 27, the rotational drive 48 can be used to position the saw blade 24 during set up, prior to cutting, and during cutting to move the blade 24 down, into and up, away from the sample.

In another embodiment (two-drive configuration; not shown in FIGS. 5A-8B), the turret assembly 26 is mounted to the base 14 and/or the housing 12 of the saw 10; no driven conveyor 46 is used. The x-axis drive 36 moves the blade assembly 30 along the x-axis as illustrated in FIGS. 6A and 6B. Rather than using two additional drives—conveyor drive 27 and rotational drive 48—for movement along the y-axis and the z-axis, this other embodiment only uses the rotational drive 48 for movement along both the y-axis and the z-axis. As noted above, the blade drive 28 and the blade assembly 30 are eccentrically mounted to the turret assembly 26. As such, as the rotational drive 48 rotates the turret assembly 26, the blade drive 28 and the blade assembly 30 will move up and down (generally along the z-axis) as well as forward and back (along the y-axis) due to the nature of the arcuate path, as illustrated in FIGS. 8A and 8B. Thus, the saw 10 can use two drives 36, 48 for 3-dimensional movement and adjustability along the x-, y- and z-axes of the blade assembly 30. The blade drive 28 rotates the blade 24 but does not move the assembly 30 along any axes.

Therefore, at least two drives for moving the blade assembly 30 along the x-axis, the y-axis and the z-axis at least two drives can be used. A three-drive configuration—the x-axis (or first) drive 36, the conveyor/y-axis (or second) drive 27, and the rotational/z-axis (or third) drive 48—allows more movement of the blade assembly 30 along the y-axis than the two-drive configuration described above.

Because the cutting or sample preparation process is carried out using a cooling/lubricating/rinse fluid that is sprayed onto the blade 24 and sample on the interior of the saw 10 (that is the region in which the sample is cut), this cutting region 50 will be wet and likely full of debris. To maintain the fluid and debris in the cutting region 50 and to prevent to fluid and debris from entering into the portion of the saw in which the drives are housed (the drive region 52), while allowing movement of the turret assembly 26 to effect cutting, the turret assembly 26 is mounted though an elongated opening 54 in a portion of the housing 12 that separates the cutting region 50 from the drive region 52. As seen in FIG. 4, a series of overlapping multi-pass leaves 56 is positioned in the elongated opening 54 and around the turret assembly 26. The series of overlapping multi-pass leaves 56 provide a barrier between the cutting region 50 and the drive region 52 and prevent the ingress of fluid and debris into the drive region 52. As the turret assembly 26 is moved along the y-axis, the leaves 56 pass or slide over one another maintaining a barrier between the regions 50, 52 and allowing the turret assembly 26 to move freely along the y-axis.

A dressing assembly 58 of an embodiment of the present invention is illustrated in FIGS. 3-4 and 9A-12B. The dressing assembly 58 dresses the blade 24 to remove worn material from the blade 24 and expose a fresh cutting surface or edge. The dressing assembly 58 includes, generally, a dressing mount 60, a dressing drive 62 and a dressing wheel 64. The dressing assembly 58 can be operated in a fully automatic mode. Unlike prior known systems that use sticks, the present assembly uses an indexing, rotatable wheel 64. Moreover, unlike prior known systems in which an operator was required to move the blocks to expose fresh dressing material, the present system can be programmed to automatically dress a blade 24 to provide better and more consistent cutting quality and to increase blade 24 life.

The dressing mount 60 is mounted to the drive shaft sleeve 34 so that it moves along the x-, y- and z-axes with the blade assembly 30 but remains rotationally stationary with the sleeve 34 (other than the arcuate movement when rotating the turret assembly 26 in the z-axis direction), as illustrated in FIGS. 3 and 4 (blade 24 removed for visibility). In this manner, the dressing assembly 58 remains in a constant position relative to the rotating blade 24. The mount 60 includes upper and lower rails 66, 68 having a series of aligned openings 70. The rails 66, 68 have an inwardly extending guide portion 72 on the sides that face one another. The lower rail 68 includes larger bored out or cut out regions 74 adjacent to and forming part of the openings 70.

In other embodiments, the dressing mount 60 and assembly 58 are movable with the blade assembly 30 but are not mounted on the blade assembly 30, thus requiring additional dressing drives to match the movement of the blade assembly 30. In yet other embodiments, the dressing mount 60 and assembly 58 are mounted on the blade assembly 30 but are not movable with the blade assembly 30. For example, the dressing mount 60 may be mounted to a non-extending/reciprocating portion of a shaft sleeve.

The dressing drive 62 includes a housing 76 having two dressing drives 78, 79. A mounting block 80 is mounted to the housing 76 to facilitate mounting the dressing drive housing 76 to the mount 60. The mounting block 80 includes an opening 82 to accommodate a pin 84 that is inserted through one of the openings 70 in the upper rail 66, through the opening in the mounting block 82 and through the corresponding opening in the lower rail 68 to secure the housing 76 to the dressing mount 60. In an embodiment, the pin 84 includes a spring biased plunger 86 that is operably connected to a locking member, such as ball detents 88 positioned in the pin 84. When the 86 plunger is depressed, against the bias, the ball detents 88 are free to move inwardly, into the pin 84. When the plunger 86 is released, the spring biases the ball detents 88 outwardly which locks the ball detents 88 in place in the lower rail cut out region 74.

In an embodiment, the housing 76 is pivotally mounted to the mounting block 80. The housing has a pivot bearing 90.

The pivot bearing 90 is positioned in a circular opening 92 in the mounting block 80 such that the housing 76 pivots about the bearing 90 in the opening 92. A pivot drive 78, operates in conjunction with the mounting block 80 and pivot bearing 90 on the housing 76. As seen in FIGS. 9A-9D and 12A-12B, the pivot drive 78 is eccentrically mounted to a roller 94 that is positioned in an elongated or slotted opening 96. As such, as the pivot drive 78 rotates, the eccentrically mounted roller 94 moves through the slotted opening 96 pivoting the entirety of the housing 76 relative to the dressing mount 60.

A dressing wheel drive 79 (also known as, e.g., indexing drive 79) is mounted to rotationally move the dressing wheel 64. The dressing wheel drive 79 is an indexing drive, such as an indexing motor, to incrementally rotate the wheel 64 a fixed amount (e.g., through a predetermined angle) at a given time. For example, it may be desired to rotate the wheel 74 ten degrees when beginning a new dressing cycle to expose the blade 24 to a fresh or unused portion of the wheel 74. In this case, the indexing motor 79 will actuate to rotate the wheel 74 that desired incremental amount.

The dressing assembly 58 can be operated in an automatic mode (executed by the controller 20 of the saw 10 or a separate controller) in which it dresses the rotating blade 24 by controlling the dressing drives 78, 79 at specified intervals, such as time, or in a manual mode in which an operator commences the dressing cycle. The dressing assembly 58 is configured to operate by pivoting the housing 76 (and thus the dressing wheel 74) into and out of contact with the blade 24. The dressing wheel 74 can be moved into contact with the blade 24 based on time, number of cycles, or any other desired parameter, during a cutting cycle or off-cycle. Moreover, the dressing wheel 74 can be indexed at any time as well, by pivoting the housing 76 to the non-contact position and indexing the wheel 74. The wheel can then be pivoted back into contact with the blade 24 as desired.

Referring to FIGS. 3 and 13A-17B, the saw 10 includes a novel sample clamping assembly 100 to hold a sample in place in the saw 10. Unlike known clamping systems that require tools to secure a sample in a location on the saw for cutting, the present sample clamping assembly 100 is a tool-less system, in which the sample can be clamped in a saddle and secured in place on the saw using a click-lock system without the use of tools. The sample clamping system 100 includes one or more rails 102 mounted to the base 14, a sample mount 104 that cooperates with a rail 102 and a vise or saddle 106. The saddle 106 is mounted to sample mount 104 and supports the sample.

Referring to FIGS. 3, 13A-13B, and 14 in an embodiment the saw 10 includes a pair of rails 102 parallel to and spaced from one another on the base 14 of the saw 10. The rails 102 are mounted in mirror image relation to one another. The rails 102 include a main body 108, a lip 110 extending from an upper portion 112 of the main body 108 on one side and a recess 114 on an opposite side of the main body 108, below the upper portion 112. An upper ledge 116 of the lip 110 is rounded, and an upper wall 118 between a top surface 120 and the recess 114 is angled downwardly as it approaches the recess 114. The rails 102 include aligning pin openings 122 and fasteners openings 124 to receive aligning pins 126 and fasteners 128 to align and secure the rails 102 on the base 14.

The sample mount 104 is illustrated in FIGS. 13A-13B and 15A-14B and includes a base 130 that secures to one of the rails 102, and in an embodiment, an upstanding post 132 to which the saddle 106 is secured. The post 132 can be secured to the base 130 by, for example, a fastener 134.

Figure 15A:
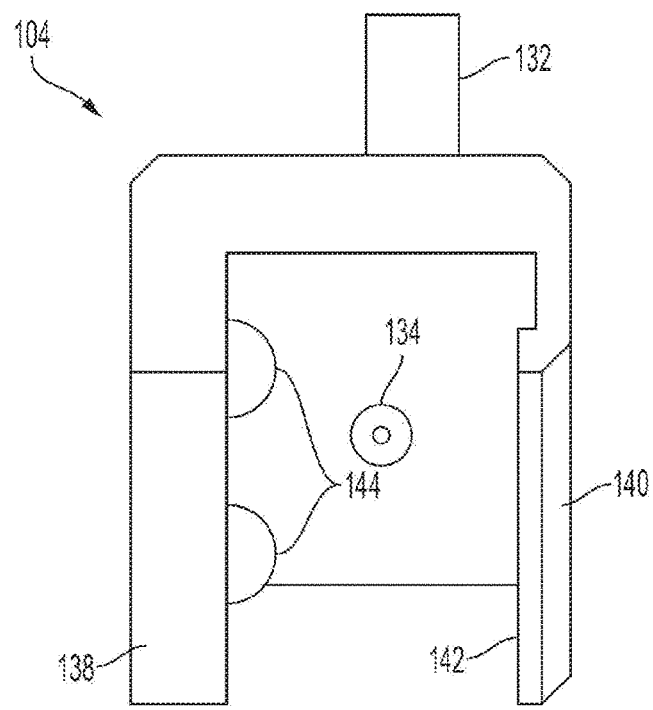
FIG. 15A is a bottom view of an embodiment of a mount of the sample clamping assembly.
Figure 15B:
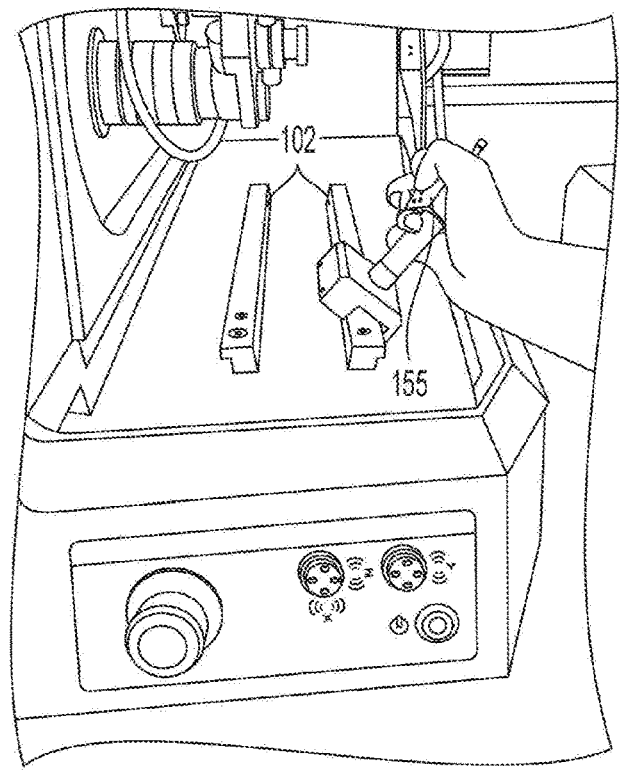
FIG. 15B is a perspective view of the cutting region of the saw showing the sample clamping assembly.

The base 130 of the sample mount 104 includes a channel 136 defined by a long leg 138 and a short leg 140. The short leg 140 has an inwardly oriented lip 142. The lip 142 extends inwardly of the channel 136. Biased ball detents 144 are positioned the long leg 138, opposite of the lip 142. The ball detents 144 are biased outwardly of the long leg 138 (or inwardly of the channel 136). As seen in FIG. 15B, the mount 130 is removably positioned on (i.e., secured to) the rail 102 by holding the base 130 at an angle and engaging the inwardly oriented lip 142 on the short leg 140 with the rail lip 110. As the lips 142, 110 are engaged, the sample mount 104 is urged (rotated) downwardly such that the biased ball detents 144 pass over the angled upper wall 118. As the ball detents 144 pass over the wall 118 they engage and lock into the recess 114 on the rail 102. In this position, illustrated in FIG. 13B, the sample mount 104 is secured to the rail 102.

Figure 16:
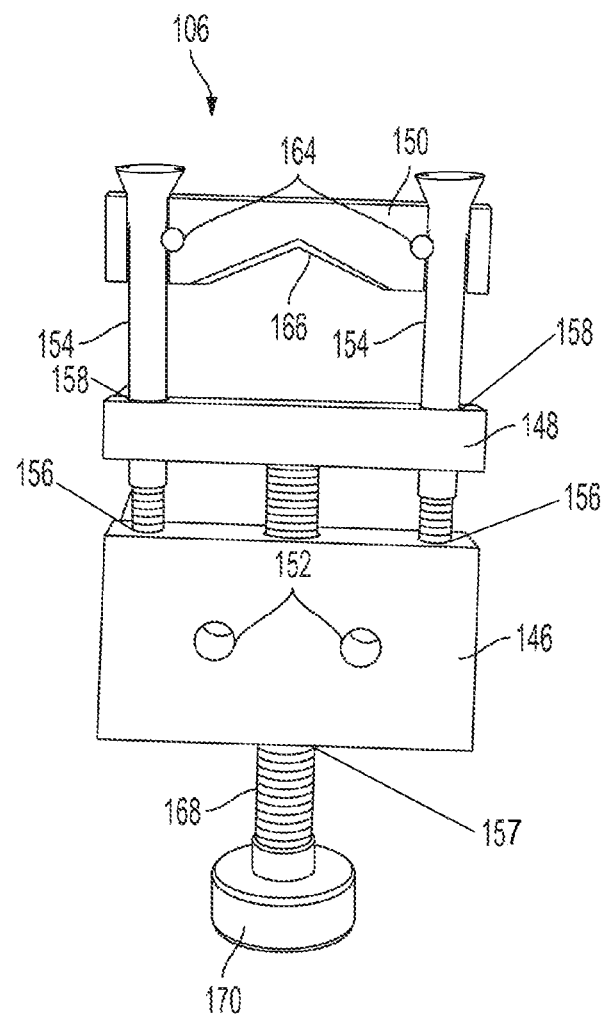
FIG. 16 is a front view of a saddle of the sample clamping assembly.
Figure 17A:
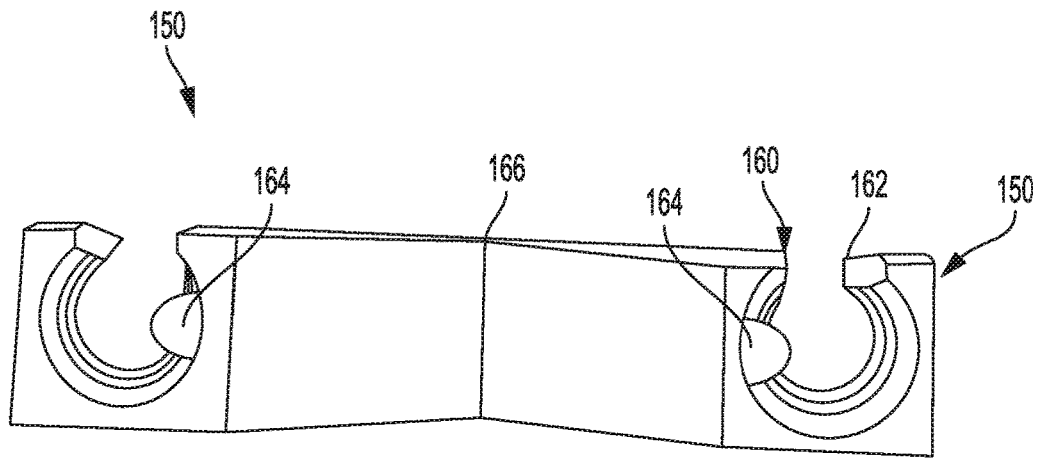
FIG. 17A is a bottom view of a movable center bar of the saddle.
Figure 17B:
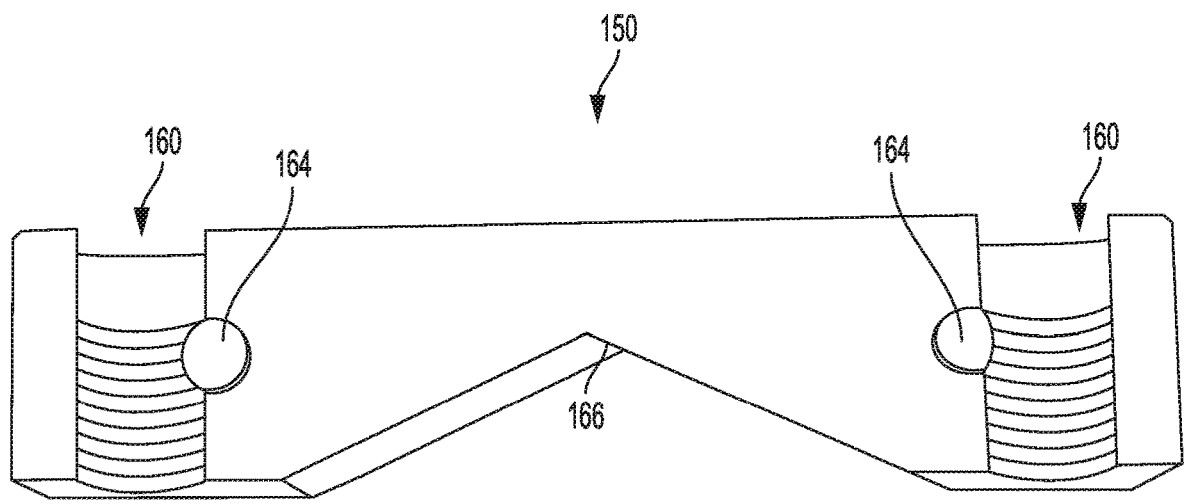
FIG. 17B is a front view of the movable center bar of FIG. 17A.

The vise or saddle 106 is mounted to the upstanding post 132 to which the sample is secured. An embodiment of the saddle 106 is illustrated in FIGS. 16 and 17A-17B. The saddle 106 includes a base 146, a movable center bar 148 and a clamp 150. In an embodiment, the base 146 includes threaded openings 152 in which fasteners 155 (illustrated in FIG. 15B) are positioned to mount the saddle base 146 to the post 132 of the sample mount 104.

The center bar 148 and the clamp 150 are mounted to the saddle base 146 by a pair of fasteners 154, such as the illustrated shoulder bolts that are threaded into the openings 156 in the base 146. The movable center bar 148 includes a pair of openings 158 through which the bolts 154 extend. The center bar 148 moves freely along the bolts 154. The clamp 150 includes a pair of U-shaped cut-outs 160 configured to receive the bolts 154. As illustrated in FIG. 17A, the U-shaped cut-outs 160 have a countersunk region 162 at an upper end of the cut-outs 160 and an insert 164 that extends along a portion of the one of the sides of the cut-out 160. The countersunk region 162 is sized and configured to receive the head of the bolt 154, but not allow the bolt head to pass beyond the countersunk region 162. In an embodiment, the insert 164 is formed from a resilient material, such as a suitable polymeric material, such as polytetrafluoroethylene (PTFE), for example TEFLON®, that allows the shank of the bolt 154 to be inserted into the U-shaped cut-out 160 from the side, and retains the bolt 154 shank in place in the cut-out 160. This arrangement allows the clamp 150 to be removed from the bolts 154, without tools and without the need to fully unthread the bolts 154. The clamp 150 can include a shaped region, such as the illustrated V-shaped region 166 for receiving and securing the sample.

The saddle 106 includes a threaded rod 168 that threads into the base 146 and bears against the moveable center bar 148. As the rod 168 is threaded toward the center bar 148, it exerts a force on the bar 148 to move the bar 148 toward the clamp 150 to secure the sample between the bar 148 and the clamp 150. In an embodiment, the threaded rod 168 includes an adjusting knob 170, such as the illustrated knurled knob to facilitate threading the rod 168 into and out of engagement with the movable center bar 148. In an embodiment, the saddle base 146 includes a threaded bore 157 extending fully though the base 146 such that the rod 168 extends fully though the base 146. In this embodiment, as illustrated in FIG. 16, the knob 170 is mounted to the rod 168 below the saddle base 146 (or opposite the clamp 150).

Figure 18:
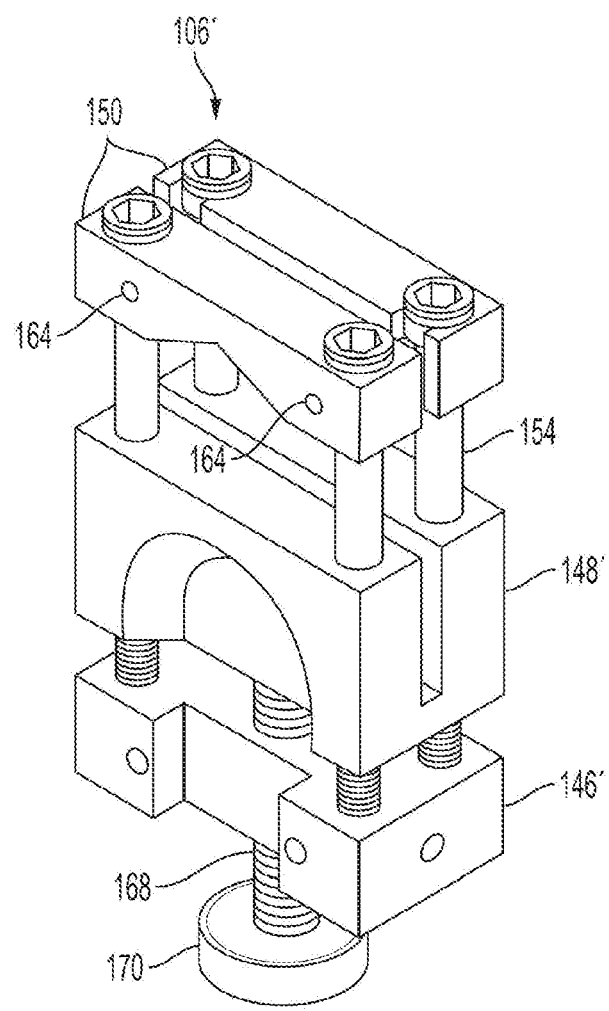
FIG. 18 is a perspective view of an embodiment of a double saddle of the sample clamping assembly.

An alternate embodiment of the saddle is a double saddle 106', illustrated in FIG. 18, that includes a pair of clamps 150, each clamp 150 being mounted to the moveable center bar 148' and saddle base 146' by a pair of shoulder bolts 154. In such an embodiment, one center bar 148' can be configured to cooperate with both clamps 150 and a single threaded rod 168 can be used to move the center bar 148' into and out of engagement with the clamps 150. Such a double saddle 106' may be used with larger samples. The double saddle 106' can include the adjusting knob 170 mounted below the saddle base 146' opposite the clamps 150 or between the center bar 148' and the base 146'.

The saw 10 can include a manual spray 181, illustrated in FIG. 1, for rinsing within the cutting region 50 and an automatic spray (through nozzle 185 and fluid conduit [not shown], illustrated FIG. 3) to provide rinse/lubricating/cooling fluid to the blade 24 and sample during cutting operations. The position of the automated spray nozzle 185 is adjustable along support 187. The nozzle 185 is secured in position by knob 189.

Figure 20:
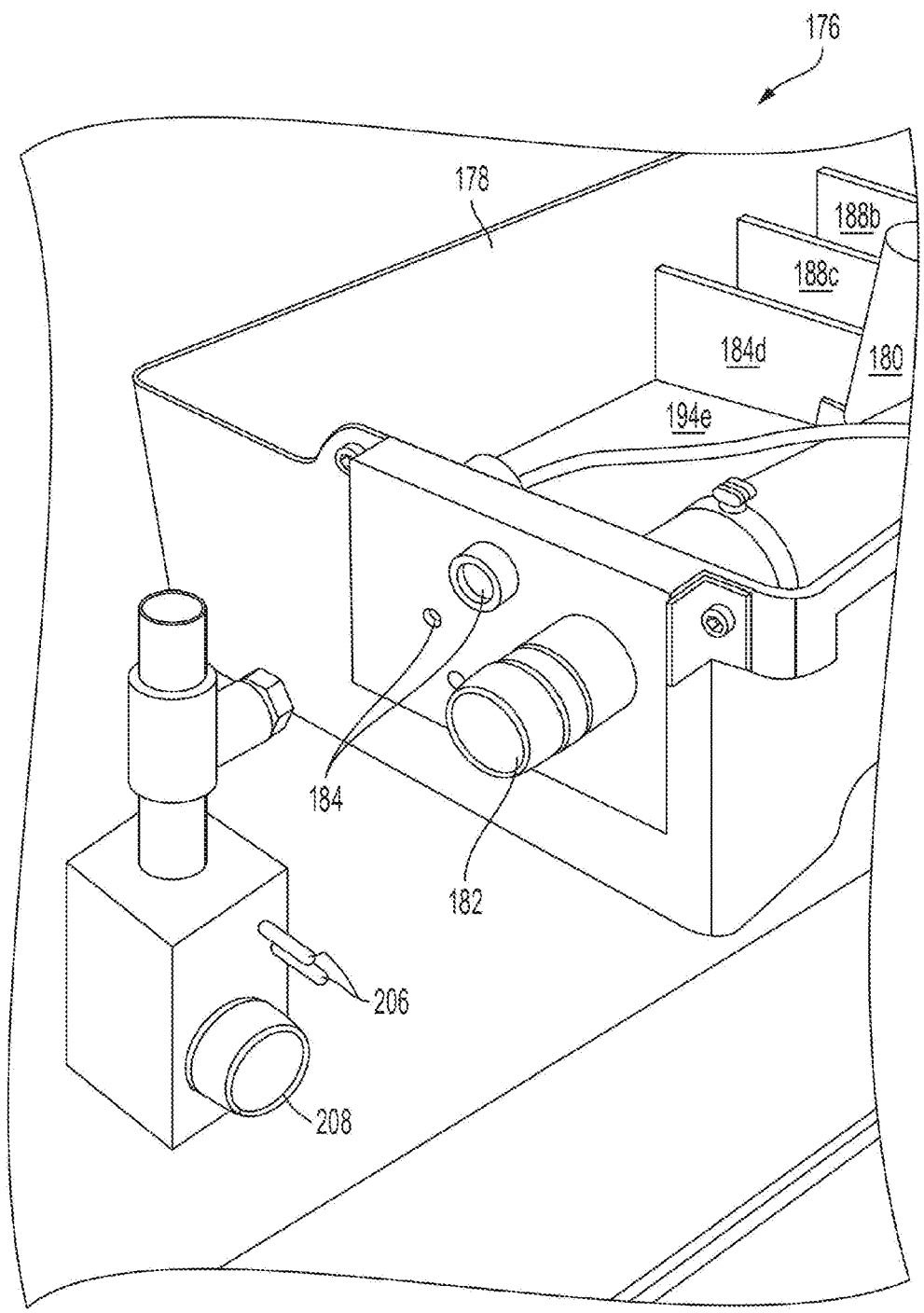
FIG. 20 is a perspective view of quick connect connectors of the reservoir system of FIG. 19.
Figure 21:
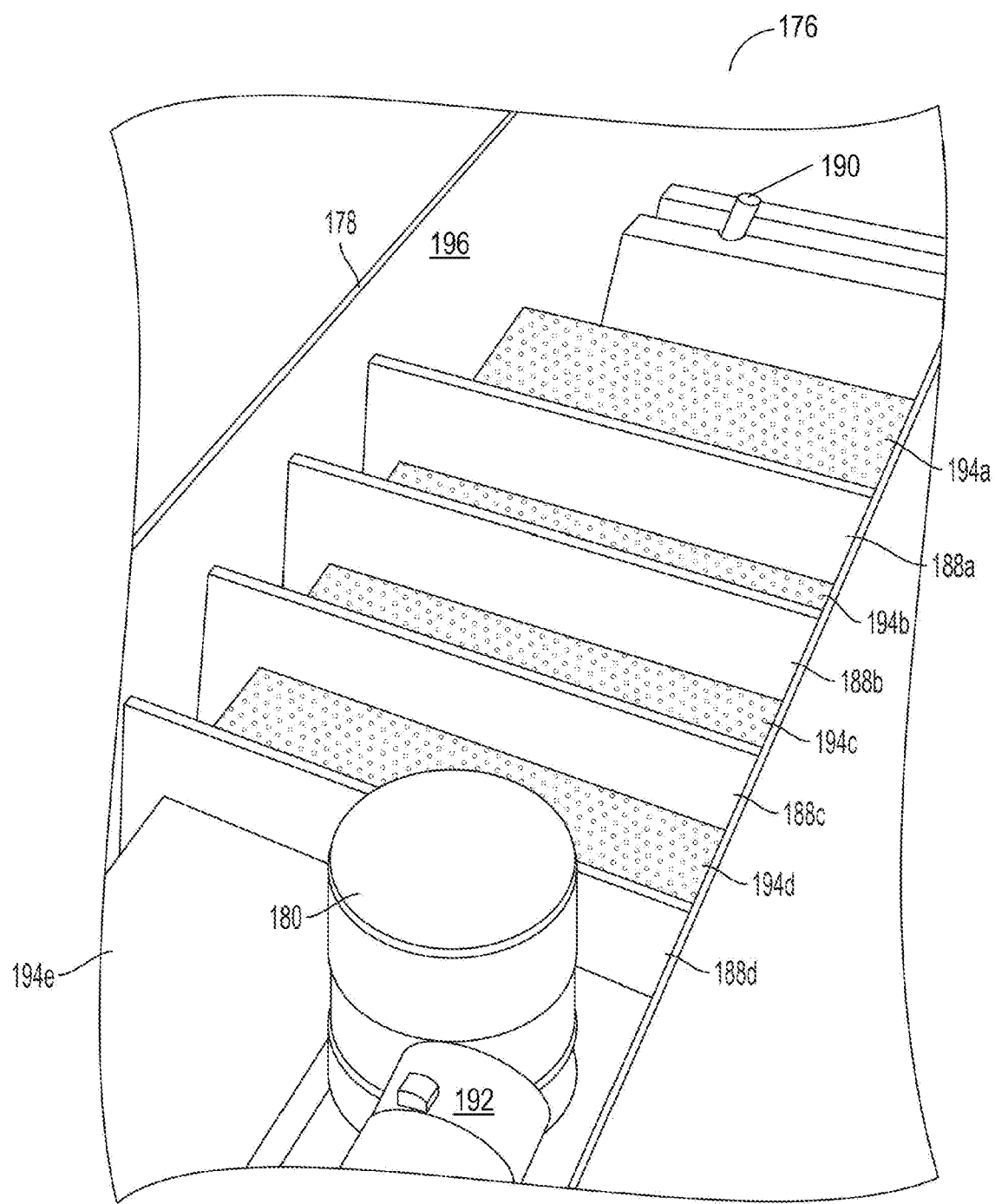
FIG. 21 is a perspective view of weirs and screens of the reservoir system of FIG. 19.
Figure 22:
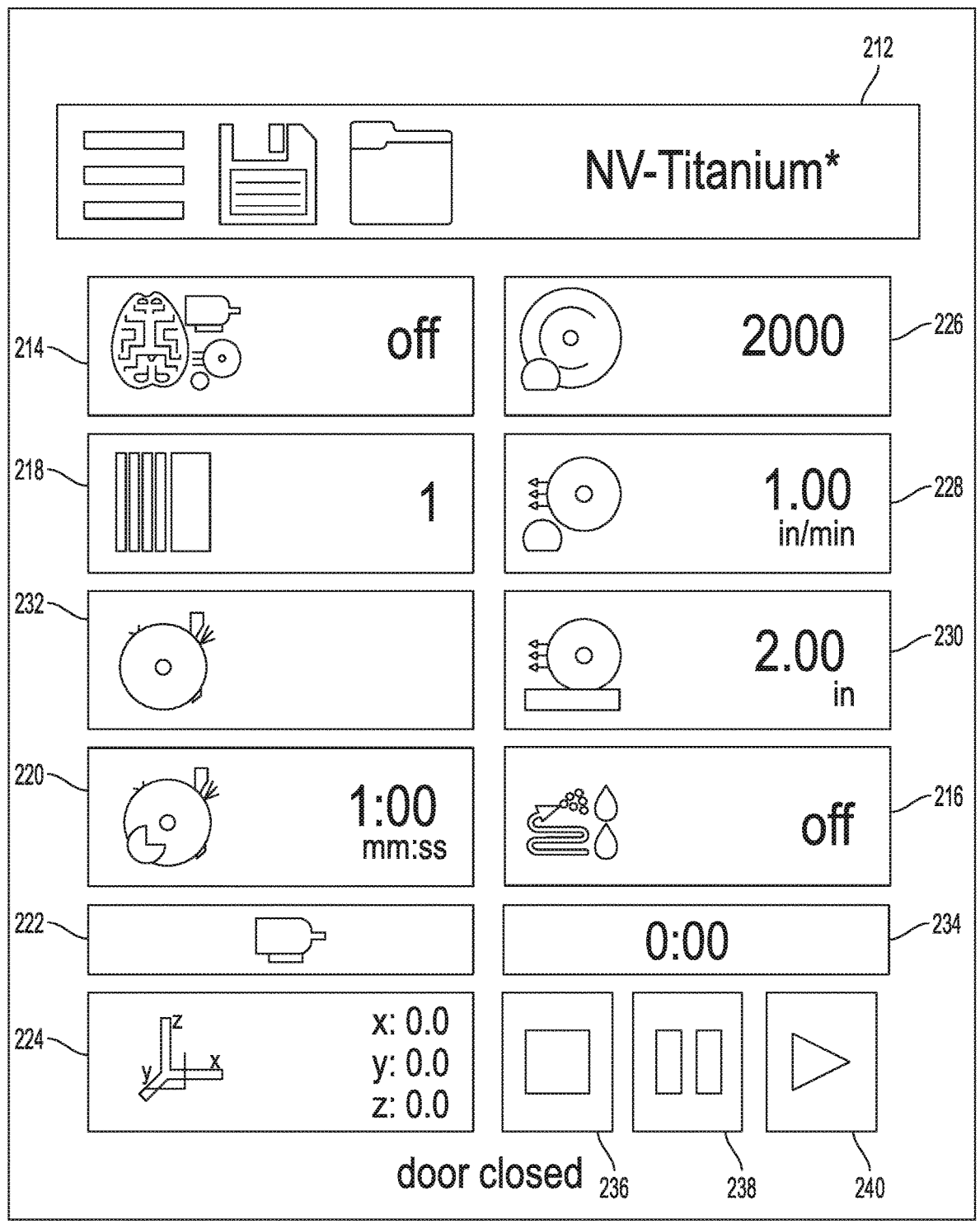
FIG. 22 is an embodiment of a graphical user interface used for operation of the saw of the present invention.

Referring now to FIGS. 1 and 19-21, the saw 10 includes a novel fluid reservoir recirculation system 176 that separates and entraps debris and swarf from the rinse fluid. The reservoir system 176 includes a basin 178, a pump 180 and reservoir quick connect connections 182, 184 for the pump 180, and may include debris screens 186. FIG. 20 illustrates the reservoir connections 182, 184 next to receiving connections 206, 208 (demonstrably removed from the receiving area 204 of the base 14 of the saw 10). The reservoir quick connect connection 182 connects to receiving quick connect connection 208, and both are fluid connectors providing an outlet for the pump 180. The reservoir quick connect connection 184 connects to receiving quick connect connection 206, and both are electrical connectors providing power to the pump 180.

The basin includes a system of decreasing height weirs 188a-d from an inlet 190 to an outlet 192. The weirs 188a-d extend fully across a width of the basin 178 to define sections 194a-e within the basin 178. The weirs 188 extend upwardly along, but not to the top of the sidewalls 196 of the basin 178. In the embodiment illustrated in FIGS. 19-21, weir 188a is the upstream weir (i.e., the tallest) and weir 188d is the downstream weir (i.e., the shortest). Unlike known system which use a serpentine wall arrangement, the reservoir system 176 of the present invention uses a series of differing height weirs 188a-d provide an overflow path for the fluid which better facilitates settling of debris within the basin 178. The basin 178 includes a cover 198 having a catch basket 200 with an inlet screen 202 at the inlet side 190 of the basin 178. The pump 180 is positioned in the basin 178 at the outlet 192 and takes suction directly from the basin 178.

The reservoir system 176 is positioned in a receiving section 204 (illustrated in FIG. 1) of the base 14 of the saw 10. The pump fluid and electrical connections 182, 184 are quick connect fittings. That is power is provided to the pump 180 via reservoir connection 184 from receiving connection 206 internal to the base 14. Likewise, the pump 180 discharges rinse fluid into the housing 12 (via the nozzle 185 and/or spray 181) via reservoir connection 182 on the basin 178 to the receiving connection 208 internal to the base 14. In this manner, the reservoir system 176 is slid into the base 14 of the saw 10, and when in position, is connected to power supply and fluid discharge without any connections being made by the operator.

The decreasing height weirs 188 allow flow from one section 194 to the next downstream section, but reduce the turbulence of the flow through the basin 178. This in turn allows the debris and swarf to better separate from the fluid and settle out in the basin 178 which reduces the amount of debris and swarf (and solids generally) that may be drawn into the pump 180, thus reducing the wear on the pump 180.

The controller 20 is configured to facilitate easy setup, monitoring and operation, as well as changes to operating parameters of the saw 10. The controller 20 can be configured to allow all or some of the functions or operation of the saw 10 in an automatic mode or in a manual mode. The graphical user interface (GUI) 22 is illustrated in FIG. 22. The GUI 22 includes a series of pictorial elements for setup and operation of the saw 10. In an embodiment, the pictorial elements include an icon or like picture representing an operator set point for a specific action. In an embodiment, the GUI 22 is a touch panel 210 (illustrated in FIG. 1) that allows for direct adjustment of the various saw functions.

The controller 20 is for example, but not limited to, a processor, multiprocessor, microcontroller, or another suitable programmable device. The controller 20 includes a plurality of electrical and electronic components that provide power, operational control, and protection to components within the saw 10. In some embodiments, the controller 20 includes, among other things, a control unit, an arithmetic logic unit, and a plurality of registers. In some embodiments, the controller 20 is partially or entirely on a semiconductor such as, for example, but not limited to, a field-programmable gate array chip.

In an illustrative embodiment, the GUI 22 includes a first touch region 212 (referred to as buttons), for menu commands, alternating between screens and save and file options. Additional buttons may include a smart cut button 214, a coolant on/off button 216, a cut position button 218, an automatic blade dressing button 220, a motor load indicator 222, a coordinates button 224, a blade speed button 226, a feed rate button 228, a cut length button 230, a button 232 to manually commence blade dressing, an estimated time remaining indicator 234 and program stop, pause and play buttons 236, 238 and 240. All of the buttons provide commands to the saw 10 through the controller 20. Alternate menu screens may provide for menu commands, such as settings information, machine information, and error logs as well as settings, such as lighting, laser sight on/off, the units used (English/Metric), language and reservoir system settings.

In addition to the user operation through the GUI 22, referring to FIG. 2, in an embodiment, the control panel 18 includes a power on/off switch 242, an emergency stop switch 244 and joy stick controllers 246, 248 for adjusting the location of the rotating blade 24. In an embodiment, the joy stick controllers can include a first controller 246 for controlling both the x- and z-axis location of the blade 24 and a second controller 248 for controlling the y-axis location of the blade 24. It will be appreciated that such a control system which uses pictorial elements to represent saw 10 functions improves the ability to setup and control the saw 10 in multi-lingual applications.

Those skilled in the art will recognize the programming necessary to effectuate operation and control of the systems, and will appreciate the numerous other ways in which the systems' controls can operate.

In the present disclosure, the words "a" or "an" are to be taken to include both the singular and the plural. Conversely, any reference to plural items shall, where appropriate, include the singular.

From the foregoing, it will be observed that numerous modifications and variations can be effectuated without departing from the true spirit and scope of the novel concepts of the present disclosure. It is to be understood that no limitation with respect to the specific embodiments illustrated is intended or should be inferred. The disclosure is intended to cover all such modifications as fall within its scope.

What is claimed is:

1. A sample preparation saw, comprising:
a base;
a saw assembly mounted to the base, the saw assembly including
a blade assembly having a rotating blade, the blade assembly movable in directions along an x-axis, a y-axis and a z-axis, the x-axis, the y-axis, and the z-axis being mutually orthogonal, and
at least two drives for moving the blade assembly in the directions of at least two of the x-axis, the y-axis and the z-axis, wherein the blade assembly moves along the z-axis in an arcuate movement by one of the at least two drives for moving the blade assembly; and
a reservoir system operable to recirculate a rinse fluid sprayed on the rotating blade of the blade assembly.

2. The sample preparation saw of claim 1, the reservoir system including a basin having a pump positioned therein, the basin having a series of weirs extending across a width of the basin, each of the weirs of the series of weirs having a height, wherein a height of an upstream one of the series of weirs has a height greater than a height of a downstream one of the series of weirs.

3. The sample preparation saw of claim 2, wherein the series of weirs includes at least three weirs, and wherein the height of the weirs decreases from the upstream weir to the downstream weir.

4. The sample preparation saw of claim 2, wherein each of the weirs defines a section within the basin and including a screen in at least one of the sections.

5. The sample preparation saw of claim 1,
including a controller for controlling the at least two drives to move the blade assembly along the x-, y- and z-axes,
wherein the controller receives user input for controlling movement along the x-, y- and z-axes from a control panel on the housing.

6. A sample preparation saw, comprising:
a base;
a saw assembly mounted to the base, the saw assembly including
a blade assembly having a rotating blade, the blade assembly movable in directions along an x-axis, a y-axis and a z-axis, the x-axis, the y-axis, and the z-axis being mutually orthogonal, and
at least two drives for moving the blade assembly in the directions of at least two of the x-axis, the y-axis and the z-axis; and
a turret assembly, and the at least two drives including
a first drive for moving the blade assembly along the x-axis,
a second drive for moving the blade assembly along the y-axis, and
a third drive for moving the blade assembly along the z-axis,
wherein the first drive and the third drive are mounted to the turret assembly and the second drive moves the turret assembly along the y-axis; and
a reservoir system operable to recirculate a rinse fluid sprayed on the rotating blade of the blade assembly.

7. The sample preparation saw of claim 6, wherein the turret assembly is mounted on a conveyor, and wherein the second drive moves the conveyor along the y-axis.

8. A sample preparation saw, comprising:
a base;
a saw assembly mounted to the base, the saw assembly including:
a blade assembly having a rotating blade, the blade assembly movable in directions along an x-axis, a y-axis and a z-axis, the x-axis, the y-axis, and the z-axis being mutually orthogonal, the blade assembly including:
a telescopic shaft for imparting rotational movement to the rotating blade, and
a blade drive for rotationally driving the rotating blade via the telescopic shaft, wherein the blade assembly moves along the x-axis in a reciprocating movement of the telescopic shaft by one of the at least two drives for moving the blade assembly; and
at least two drives for moving the blade assembly in the directions of at least two of the x-axis, the y-axis and the z-axis; and
a reservoir system operable to recirculate a rinse fluid sprayed on the rotating blade of the blade assembly.

9. The sample preparation saw of claim 1, further comprising a dressing assembly mounted to the blade assembly and movable with the blade assembly.

10. The sample preparation saw of claim 9, the dressing assembly including
a rotatable dressing wheel and
a pivoting mount for pivoting the rotatable dressing wheel into and out of contact with the rotating blade,
wherein the rotatable dressing wheel is rotated in an indexed manner so as to expose an unused portion of the dressing wheel to the rotating blade.

11. A sample preparation saw, comprising:
a base;
a saw assembly mounted to the base, the saw assembly including
a blade assembly having a rotating blade, the blade assembly movable in directions along an x-axis, a y-axis and a z-axis, the x-axis, the y-axis, and the z-axis being mutually orthogonal, and
at least two drives for moving the blade assembly in the directions of at least two of the x-axis, the y-axis and the z-axis;
a dressing assembly, comprising:
a rotatable dressing wheel;
a pivoting mount for pivoting the rotatable dressing wheel into and out of contact with the rotating blade;
a pivot drive for pivoting the rotatable dressing wheel into and out of contact with the rotating blade; and
a dressing wheel drive for rotating the rotatable dressing wheel,
wherein the rotatable dressing wheel is rotated in an indexed manner so as to expose an unused portion of the dressing wheel to the rotating blade; and
a reservoir system operable to recirculate a rinse fluid sprayed on the rotating blade of the blade assembly.

12. A sample preparation saw of claim 1, comprising:
a base;
a saw assembly mounted to the base, the saw assembly including
a blade assembly having a rotating blade, the blade assembly movable in directions along an x-axis, a y-axis and a z-axis, the x-axis, the y-axis, and the z-axis being mutually orthogonal, and at least two drives for moving the blade assembly in the directions of at least two of the x-axis, the y-axis and the z-axis;
a sample clamping assembly, comprising:
a rail mounted to the base;
a sample mount removably positioned on the rail; and
a saddle operable to hold a sample, the saddle operably connected to the sample mount,
the rail including a main body, a lip extending from an upper portion of the main body on a side of the main body and a recess on an opposite side of the main body, below the upper portion,
the sample mount including a body having a channel defined by a long leg and a short leg, the short leg having an inwardly oriented lip for engaging the rail lip and a biased securing element,
wherein, when the sample mount is positioned on the rail, the main body inwardly oriented lip engages the rail lip and the biased securing element is positioned in the recess to secure the mount to the rail; and
a reservoir system operable to recirculate a rinse fluid sprayed on the rotating blade of the blade assembly.

13. The sample preparation saw of claim 12, wherein the biased securing element of the sample mount is a spring mounted ball detent, and wherein the sample mount is positioned on and removed from the rail without using tools.

14. The sample preparation saw of claim 12, wherein an edge of the rail lip is rounded, and wherein a surface extending between the rail upper surface and the recess is angled.

15. The sample preparation saw of claim 12, wherein the saddle includes
a base having three threaded openings;
a movable center bar having a pair of non-threaded openings, the pair of non-threaded openings being aligned with two of the threaded openings in the base;
a clamp having a pair of slotted openings aligning with the non-threaded openings in the center bar, wherein the movable center bar is positioned between the base and the clamp;
a pair of fasteners securing the movable center bar and clamp to the base; and
a threaded adjusting rod, the threaded adjusting rod being positioned in one of the threaded openings in the base, the threaded adjusting rod operable to contact and move the movable center bar toward and away from the clamp to secure and release a sample held therein.

16. The sample preparation saw of claim 15, wherein the slotted openings in the clamp of the saddle have a generally U-shaped profile.

17. The sample preparation saw of claim 15, the saddle including a resilient insert positioned to extend into the slotted opening.

18. A sample preparation saw of claim 2, comprising:
a base;
a saw assembly mounted to the base, the saw assembly including
a blade assembly having a rotating blade, the blade assembly movable in directions along an x-axis, a y-axis and a z-axis, the x-axis, the y-axis, and the z-axis being mutually orthogonal, and
at least two drives for moving the blade assembly in the directions of at least two of the x-axis, the y-axis and the z-axis; and
a reservoir system operable to recirculate a rinse fluid sprayed on the rotating blade of the blade assembly, the reservoir system including a basin having a pump positioned therein, the basin having a series of weirs extending across a width of the basin, each of the weirs of the series of weirs having a height, wherein a height of an upstream one of the series of weirs has a height greater than a height of a downstream one of the series of weirs,
wherein the base of the sample preparation saw includes a receiving region and receiving quick connect connectors,
wherein the reservoir system includes reservoir quick connect connectors,
wherein the receiving and the reservoir quick connect connectors are fluid and electrical connectors, the fluid connectors providing an outlet for the pump and the electrical connectors providing power to the pump, and
wherein the reservoir system is positioned in and removed from the receiving region of the base without using tools.

19. A sample preparation saw, comprising:
a base;
a saw assembly mounted to the base, the saw assembly including
a blade assembly having a rotating blade, the blade assembly movable in directions along an x-axis, a y-axis and a z-axis,
at least two drives configured to move the blade assembly along at least two of the x-axis, the y-axis and the z-axis, and
a turret assembly, wherein at least one of the at least two drives for moving the blade assembly is mounted to the turret assembly; and
a reservoir system operable to recirculate a rinse fluid sprayed on the rotating blade of the blade assembly, the reservoir system including a basin having a pump positioned in the basin, the basin having a series of weirs.

\* \* \* \* \*